(12) United States Patent
Alexander

(10) Patent No.: US 8,388,017 B2
(45) Date of Patent: Mar. 5, 2013

(54) FOLDABLE TRAILER

(76) Inventor: John Alexander, Santa Cruz, CA (US)

( * ) Notice: Subject to any disclaimer, the term of this patent is extended or adjusted under 35 U.S.C. 154(b) by 412 days.

(21) Appl. No.: 12/720,989

(22) Filed: Mar. 10, 2010

(65) Prior Publication Data

US 2011/0221168 A1    Sep. 15, 2011

(51) Int. Cl.
*B62D 61/00*    (2006.01)

(52) U.S. Cl. ..................................... 280/656; 280/763.1

(58) Field of Classification Search ................. 280/656, 280/79.11, 43, 46, 43.1, 43.14, 43.17, 43.24, 280/82, 83, 762, 763.1, 638, 639, 651, 652
See application file for complete search history.

(56) References Cited

U.S. PATENT DOCUMENTS

| | | | | |
|---|---|---|---|---|
| 2,720,413 | A * | 10/1955 | Halverson | 296/10 |
| 4,786,073 | A * | 11/1988 | Harper | 280/656 |
| 7,052,033 | B2 * | 5/2006 | McDonell | 280/656 |
| 7,540,528 | B2 * | 6/2009 | Spainhower | 280/656 |
| 7,891,697 | B1 * | 2/2011 | Fahrbach | 280/656 |
| 7,909,355 | B2 * | 3/2011 | Thedford et al. | 280/656 |
| 7,950,675 | B1 * | 5/2011 | Quenzi et al. | 280/6.157 |
| 2009/0134605 | A1 * | 5/2009 | Norton | 280/656 |
| 2010/0084839 | A1 * | 4/2010 | Mayfield | 280/656 |

* cited by examiner

*Primary Examiner* — John Walters
*Assistant Examiner* — Brian Swenson
(74) *Attorney, Agent, or Firm* — Donald R. Boys; Central Coast Patent Agency, Inc.

(57) ABSTRACT

A foldable trailer includes a substantially horizontal, substantially planar center section joined to at least one main axle and wheels assembly, at least one substantially planar rear section attached to the center section by a first hinged interface, such that the rear sections may be folded from a substantially horizontal position, coplanar with the center section, to a substantially vertical position relative to the horizontal center section, at least one substantially planar forward section attached to the center section by a second hinged interface, such that the forward sections may be folded from a substantially horizontal position, coplanar with the center section, to a substantially vertical position relative to the horizontal center section, a tongue section attached to an outermost forward section by a third hinged interface, such that the tongue section is enabled to fold downward around the third hinged interface, as the forward sections are folded, resulting in both the tongue section and the forward sections being oriented to a substantially vertical position relative to the center section, and a forward and a rear set of trolley legs, each set having trolley wheels. As the forward and rear sections are folded upward, the sets of trolley legs are deployed downward, lifting the folded trailer on the trolley wheels with the main axle and wheels assembly off ground level, such that the folded trailer may be moved about on the trolley wheels without interference from the main axle and wheels assembly.

8 Claims, 19 Drawing Sheets

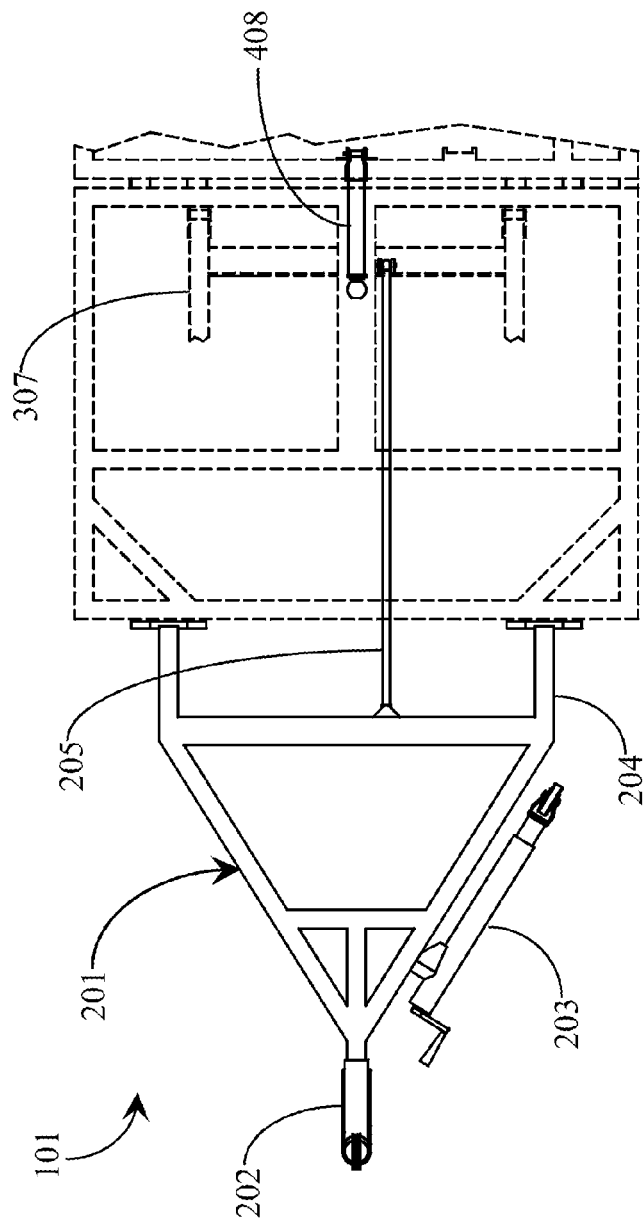
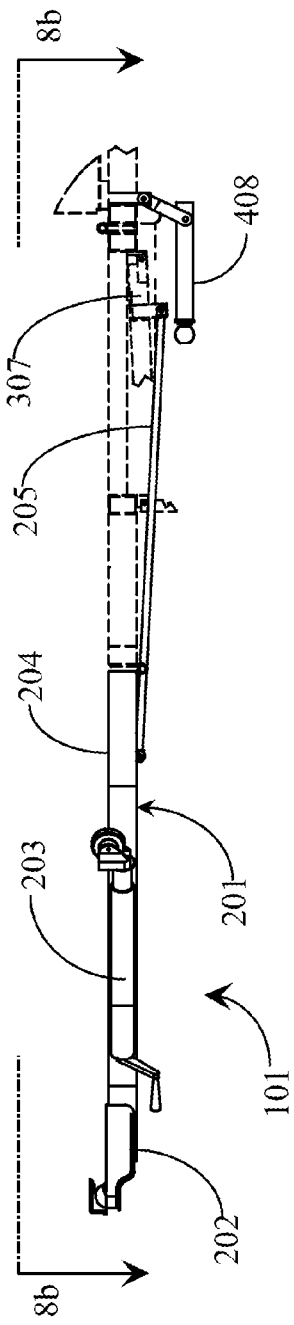

FOLDABLE TRAILER

BACKGROUND OF THE INVENTION

1. Field of the Invention

The present invention relates generally to vehicle-towed trailers and more particularly to trailers that are capable of being folded to occupy a reduced space.

2. Description of Related Art

Trailers are common to those having a need to transport various items such as motorcycles, recreation vehicles of various size and function, building materials, lawn equipment and watercraft for example. Trailers provide numerous advantages such as, but not limited to, creating additional space for the purpose of cargo transport, that would not easily be accommodated in the carrying capacity of commonly used vehicles, such as small to medium sized SUVs' and passenger cars, which have limited cargo area. A trailer may also be detached from the vehicle and placed into storage when not in use, allowing a more compact and efficient design of the towing vehicle.

A drawback to trailers is that they consist of one or more axles, a tongue section and typically a rectangular frame structure with decking, and the sections are generally permanently affixed together, making them notably rigid in design. Another drawback is the stowage of this rigid design, requiring a significant area to accommodate the trailer's size. Furthermore, it is often unacceptable in neighborhood covenants to store trailers in open view, forcing the owner to provide on-site storage facilities that require maintenance and expense, or off-site storage, that may not always be economical. Attempts have been made in the prior art to overcome the problematic storage and rigid design of trailers by developing collapsible or foldable designs that occupy smaller space. However, the folding trailers in prior art are not of a design sufficient to accommodate loads of considerable mass or volume. Other prior art trailers show designs of difficult operation, often requiring multiple personnel to perform the task of folding the trailer to a storable configuration, or to move the folded trailer to a storage area. Other designs sacrifice the trailer's load carrying capacity to be more readily folded and maneuvered.

Despite the advantages taught in prior art of foldable or collapsible trailers, improvements are still being sought by the general public. Accordingly, what is needed in the art is a foldable trailer that provides increased load carrying capacity but eliminates the need for additional personnel required for the folding operation. In addition, a trolley system that provides stability during the folding operation and ease of maneuverability with a reduced footprint, for the storage of the foldable trailer would be a unique and desirable feature.

BRIEF SUMMARY OF THE INVENTION

The inventor in the present application has recognized a need for certain features in a foldable trailer that are not provided by trailers in the current art, and has accordingly provided, in one embodiment, a foldable trailer, comprising a substantially horizontal, substantially planar center section joined to at least one main axle and wheels assembly, at least one substantially planar rear section attached to the center section by a first hinged interface, such that the rear sections may be folded from a substantially horizontal position, coplanar with the center section, to a substantially vertical position relative to the horizontal center section, at least one substantially planar forward section attached to the center section by a second hinged interface, such that the forward sections may be folded from a substantially horizontal position, coplanar with the center section, to a substantially vertical position relative to the horizontal center section, a tongue section attached to an outermost forward section by a third hinged interface, such that the tongue section is enabled to fold downward around the third hinged interface, as the forward sections are folded, resulting in both the tongue section and the forward sections being oriented to a substantially vertical position relative to the center section, and a forward and a rear set of trolley legs, each set having trolley wheels. As the forward and rear sections are folded upward, the sets of trolley legs are deployed downward, lifting the folded trailer on the trolley wheels with the main axle and wheels assembly off ground level, such that the folded trailer may be moved about on the trolley wheels without interference from the main axle and wheels assembly.

Also in one embodiment the rear sections are folded by a first powered linkage, and the forward sections are folded by a second powered linkage, and further comprising a control interface whereby the powered linkages may be operated to fold and unfold the sections. The power for the powered linkages may be provided by one or a combination of hydraulic or pneumatic motive systems.

In one embodiment there is a stabilizer foot deployable from a forward side of the center section to contact ground level. Also, the forward set of trolley lift legs may be deployed with the rear and forward sections locked coplanar with the center section, to tilt the trailer to a backward angle to facilitate loading and unloading cargo.

In some embodiments the stabilizer foot is deployed as the rear section is folded upward, to prevent the trailer from moving on the main wheels before the main wheels are lifted from ground level by deployment of the trolley legs. In addition there may be first locking mechanisms arranged to secure the forward, center, rear and tongue sections in a coplanar aspect in which the trailer may be towed for conveying cargo, and second locking mechanisms arranged to secure the forward, center, rear and tongue sections in folded aspect, the locking mechanisms including mechanisms for securing and releasing.

In many embodiments of the trailer, with the forward and rear sections arranged coplanar with the center section, and forming a trailer bed, the trailer further comprises removable side panels arranged around the periphery of the trailer bed. The side panels associated with the forward and the rear sections are enabled to be folded onto the center section prior to folding the center and forward sections relative to the center section.

In some cases there is a single forward and a single rear section, with the tongue section hinged to the forward section opposite the second hinged interface.

BRIEF DESCRIPTION OF THE SEVERAL VIEWS OF THE DRAWINGS

FIG. 8a is a partial section view of the tongue section and ball hitch receiver lock mechanisms of a foldable trailer of FIG. 3.

FIG. 8b is a partial plan view of the tongue section and ball hitch receiver lock mechanisms of a foldable trailer of FIG. 8a.

FIG. 14b is a continuation of the flowchart diagram of FIG. 14a.

FIG. 15b is a continuation of the flowchart diagram of FIG. 15a.

DETAILED DESCRIPTION OF THE INVENTION

Figure 1:
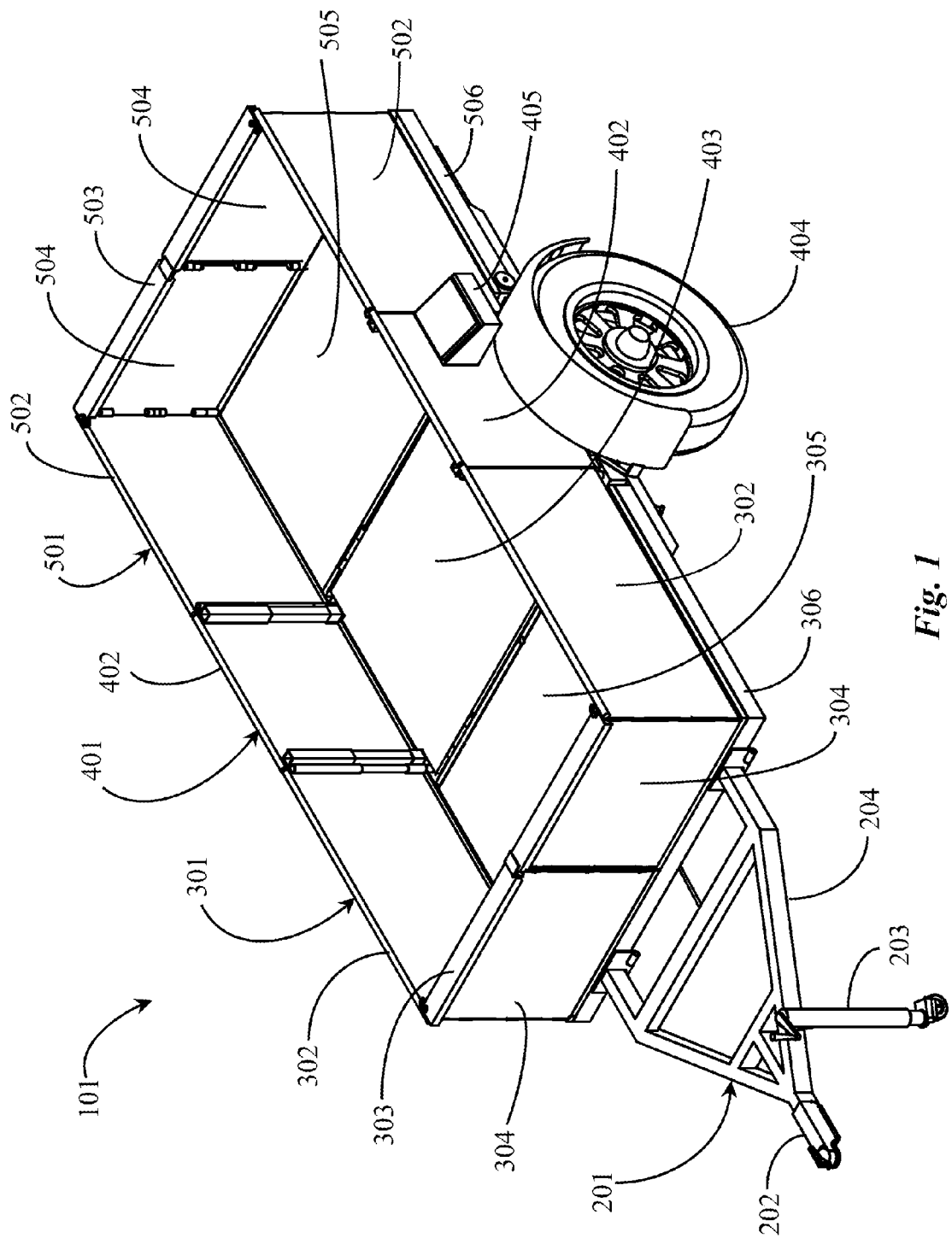
FIG. 1 is an isometric view of a foldable trailer in an embodiment of the present invention, shown in the transport position.

FIG. 1 is an isometric view of a foldable trailer 101 in an embodiment of the present invention. The foldable trailer may be configured to be towed by a number of types of vehicles (not shown). Therefore, trailer 101 is depicted generally in FIG. 1, unattached to a towing vehicle, as a "standalone" entity. It shall be noted that the foldable trailer of the present invention can be in different sizes and a various number of configurations, within the scope of this disclosure. The foldable trailer of FIG. 1, shown in an open or "unfolded" condition, comprises a tongue section 201, a forward section 301, a center section 401 and a rear section 501, all of which proportionately form a cargo carrying platform that is supported by an axle and wheel assembly 404, which provides transportability to the whole while being towed. Other embodiments of the present invention may include, but not be limited to, multiple axles to vary the load capacity of the foldable trailer, or may be "sled" runners that allow it to be transported across ice and snow surfaces, for example.

The foldable trailer of FIG. 1, generally having sections 301, 401 and 501, is has three separate rectangular box steel frame structures as illustrated in more detail in figures and description below, joined together by hinge or other acceptable method that allows free rotation. These sections, when combined as a whole, form a horizontal plane parallel to the ground surface, in which a number of different materials may be attached, for the purpose of creating a flat "deck" surface, which supports the cargo and allows it to be transported. The "deck" area may comprise individual planks, or may be large sheets of a variety of weatherproof materials that extend to the edges of the frame structure of each section. In one embodiment of the foldable trailer of FIG. 1, large plywood sheets that form elements 305, 403, and 505 are covered with a vinyl weatherproof sheathing, are wrapped on the outer edges with channel steel framing, and are attached directly to the rectangular box steel frame elements 306, 409 and 506 with suitable fasteners.

The tongue section of the foldable trailer of FIG. 1 is depicted as being supported by a trailer stand 203, which may be mounted to tongue section 201 rectangular box steel frame 204, on a cylindrical mount, in such a way that will accommodate the stand to be rotated about this mount's axis and locked into place with a release-pin (not shown), such that the stand is perpendicular to the ground surface. The trailer stand may have a swivel caster at its base, or may have any number of other roller or fixed-type bases well known in the art, and can then be lowered to make contact with the ground, providing an element of support and maneuverability. Alternatively, it may be raised and rotated parallel to the ground, while the trailer is in transit.

In an embodiment of the present invention, a perimeter wall is formed of various sized panels, held perpendicular to the "deck" surfaces, to contain or protect the cargo which may be transported with the foldable trailer. In an embodiment of the invention the panels are of formed and painted steel, but may be made of any one of a number of different materials, such as aluminum, marine plywood or solid wood planking, for just a few examples. Forward side panels 302, forward end panels 304, rear side panels 502 and rear center panels 504 are joined together using any variety of hinge and pin mechanism that allow rotating motion that accommodates the panels to be folded onto the center deck 403 area of the center section 401, as shown below in FIG. 4. In one embodiment of the invention rear end panels 502 may be combined to form one panel that may be attached by hinge or, other acceptable form that allows rotation, to the frame structure of the rear section and may be folded down to the ground, acting in a "tailgate" fashion that allows easy access for rolling stock on and off the cargo platform, for example. The side and end panels, in other embodiments of the invention, may be affixed to the platform area perimeter by upright stanchions or other forms of attachment that allow the panels to be removed and possibly stacked onto the center section, prior to the folding operation. A number of possibilities exist for the panel configuration, the options depending, but not limited to, the type of cargo that may be transported, cost effectiveness or the aesthetic preferences of the user, being many and as varied as the users.

Figure 2:
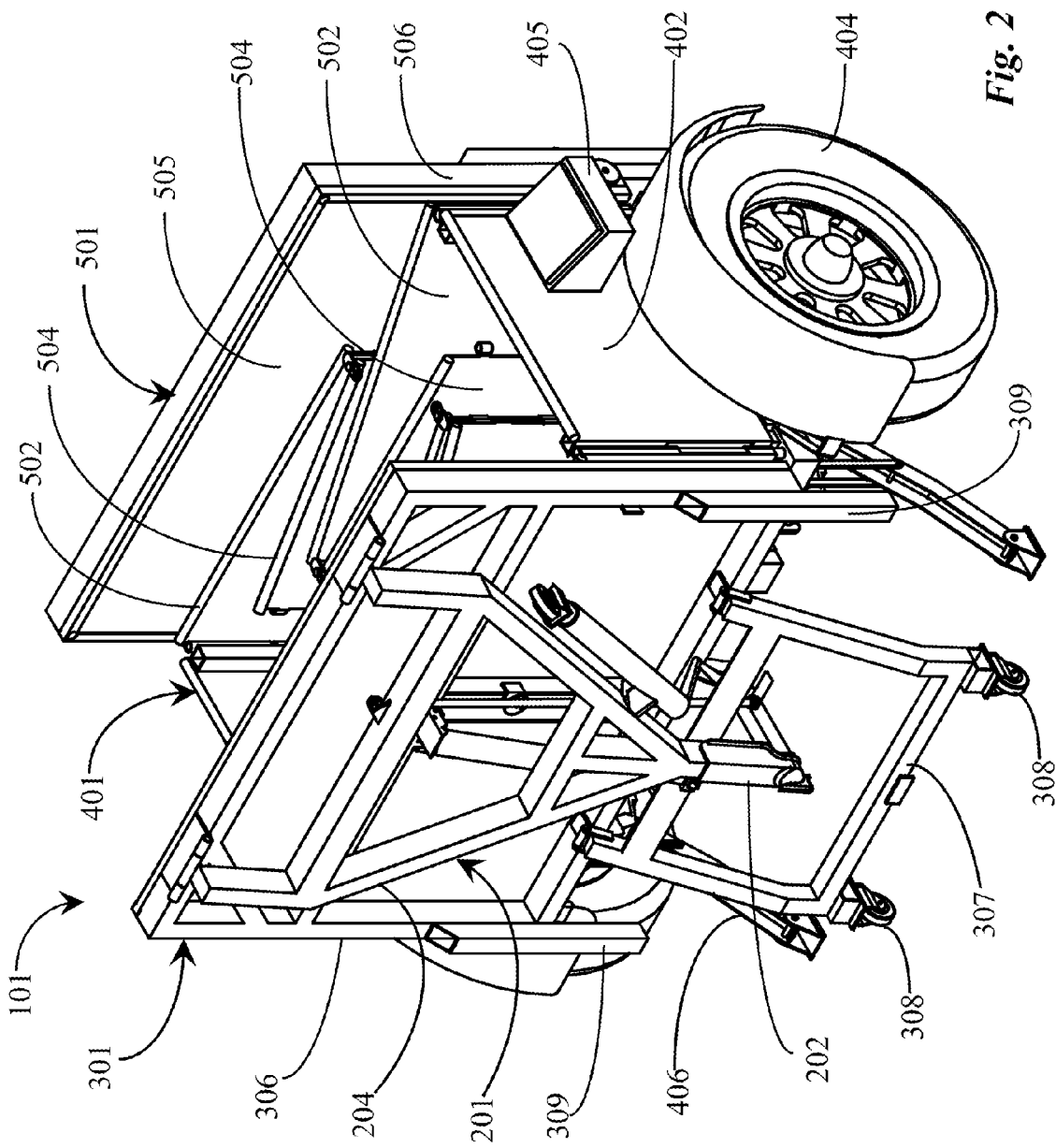
FIG. 2 is an isometric view of a foldable trailer in an embodiment of the present invention, shown in the folded position.

FIG. 2 is an isometric view of the foldable trailer of FIG. 1 shown in a closed or "folded" condition, and free standing on a trolley support system, which allows full mobility for relocation to a storage facility. The foldable trailer of FIG. 1 and FIG. 2 are comprised of four sections that are hinged transversely together, with the center section 401 acting as the pivotal section, to which the other sections are folded against. In the unfolded condition these sections form a continuously flat rectangular "deck" area, as shown and described above, where various types of cargo may be placed for transport, such as mulches, aggregates, boxes, lumber or rolling stock, for examples. The forward section 301 and the rear section 501 act independently of one another, and the tongue section 201, being acted upon by the folding of the forward section, is folded vertically to the center section, to occupy a reduced footprint, as evidenced by the length components of FIG. 1 and FIG. 2 respectively.

In one embodiment of the invention tongue section 201 is transversely joined to rectangular box steel frame 306 of forward section 301 using any one of a variety of hinge mechanisms that will allow the tongue section to rotate to the underside of the forward section, as the forward section is rotated upwardly to its "folded" state. Rectangular box steel frame 306 of the forward section is transversely joined to a rectangular box steel frame 409 of center section 401 using any one of a variety of hinge mechanisms that will allow the forward section to fold in an upward motion until coming to a near perpendicular position to the decking of the center section. To prevent an "over-rotation" state, towards the direction of rotation to the "folded" state of the forward and rear sections, a variety of "positive-stop" mechanisms (not shown) may be utilized. In one embodiment of the invention, short sections of linkable chains are used with steel plates that are welded to the underside frame structure of both the forward and rear section's frame structure rails and on the adjacent frame section rails of the center section rectangular box steel frame structure. The chain sections are then attached with bolts on both ends of these chains and connected to each opposing steel plate, with appropriate threaded hardware, allowing an element of fine adjustment.

Now, in the opposing direction, towards the direction of the "unfolded" or open state, in one embodiment of the invention the addition of "positive-stop" rails 309 and 509, of a like material to the rectangular box steel frames to which they are attached, have been utilized. They are attached to the underside exterior rails of the rectangular box steel frame elements 306 and 506 and extend beyond the hinge bearing rail of both the forward and rear sections for some length inwardly, towards the centerline of the foldable trailer's axle. The uppermost surface of these "stub" positive-stop rails make direct contact to the underside surface of the exterior rails of the center section's rectangular box frame element 409, thus preventing rotation beyond a horizontal condition.

In one embodiment of the invention, the foldable trailer, when in the "unfolded" or open state, has a forward section 301 and the rear section 501 that are locked into a horizontal position to the center section 401, preventing their upward movement in transit. The locking mechanisms (not shown) may be any one of a many varied forms, well known to practitioners of the art, to accommodate the immobility or "bounce" effect of the separate sections that make up the foldable trailer's deck area. It shall be noted here, that prior to the folding of the forward and rear sections to the "storable" state of the foldable trailer of FIG. 1 and FIG. 2, these sections must be unlocked from their horizontal and immobile condition to a "free" and rotatable condition, for the folding operation to occur.

Figure 3:
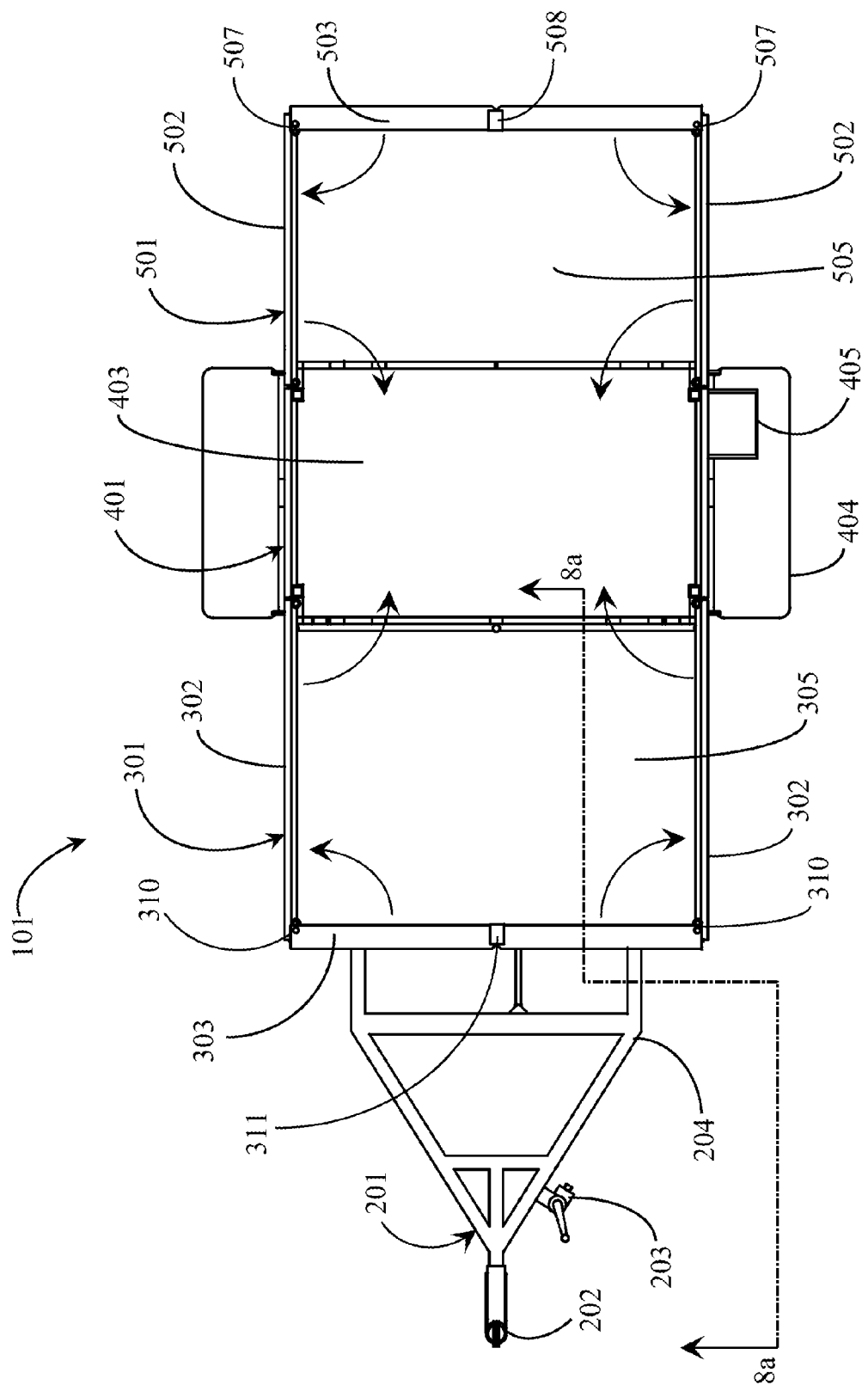
FIG. 3 is a plan view of a foldable trailer of FIG. 1 and FIG. 2, shown in the transport position and illustrates the folding directions of the side and end panels.

FIG. 3 of foldable trailer 101 is a plan view of the foldable trailer of FIG. 1 and FIG. 2 that illustrates the motion directions in which the forward end panels 304, the forward side panels 302, the rear end panels 504 and the rear side panels are folded onto the center deck 403 area. The forward end panels are folded against the forward side panels, inwardly towards the interior surfaces of the forward side panels, and each of the left side and right side forward side panels are then folded, to a near perpendicular state to the center side panels 402, of the center deck 409 area of the center section 401. The rear end panels are folded against the rear side panels, inwardly toward the interior surface of the rear side panels, and each of the left side and right side rear side panels are then folded to a near perpendicular state to the center side panels, of the center deck are of the center section.

Figure 4:
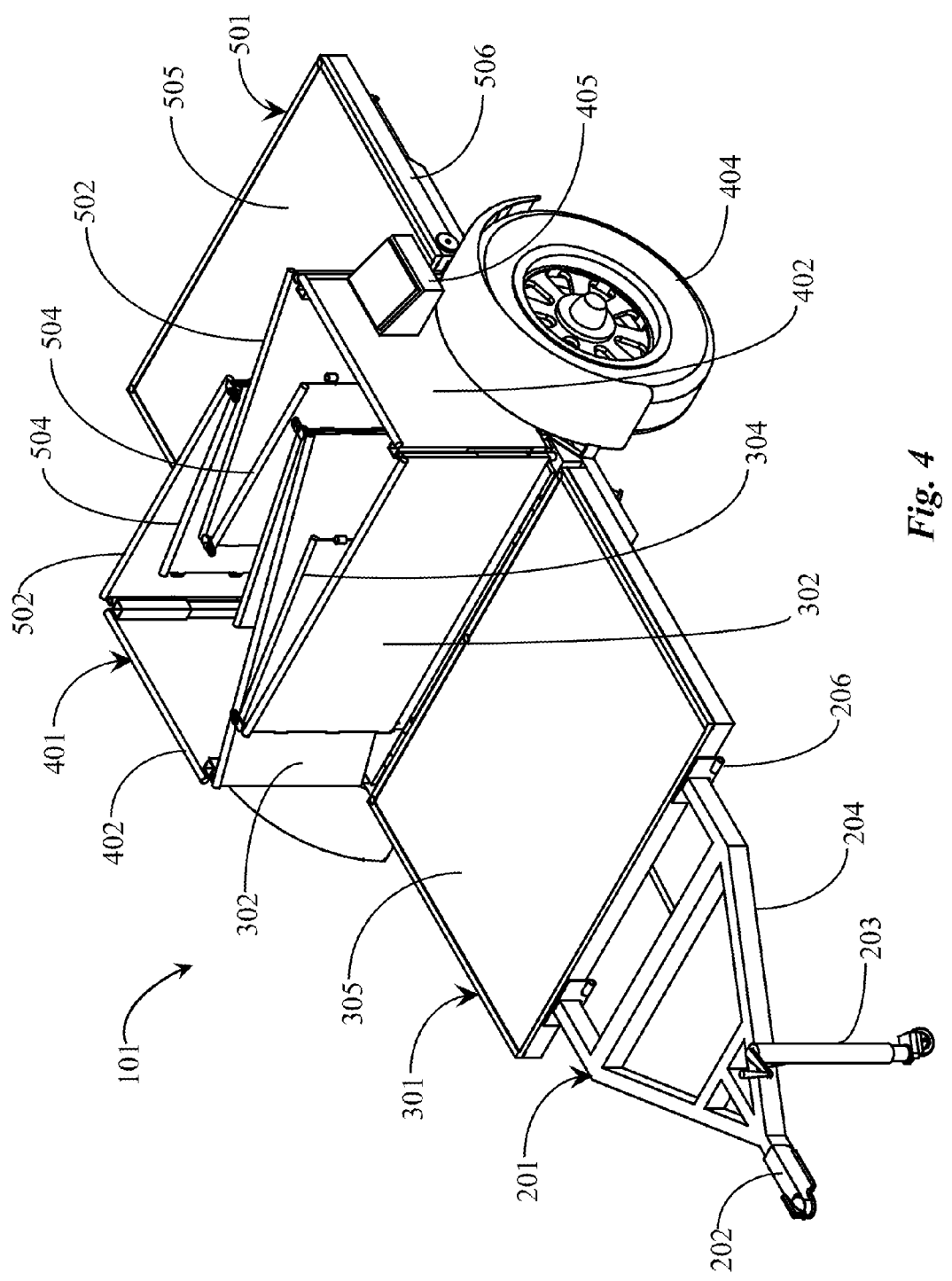
FIG. 4 is an isometric view of a foldable trailer of FIG. 1 and FIG. 2 which further illustrates the folded positions of the side and end panels of FIG. 3.

FIG. 4 is an isometric view of the foldable trailer of FIG. 1 and FIG. 2 that further illustrates the folding of the forward end panels 304, the forward side panels 302 of the forward section 301 and the rear end panels 504, the rear side panels 502 of the rear section 501 onto the center deck 403 area of the center section 401, in one embodiment of the present invention. It should be noted that the forward support panel 303 and the rear support panel 503 and the respective center hinge pins (not shown) have been removed prior to the folding operations of the aforementioned panels.

Figure 5:
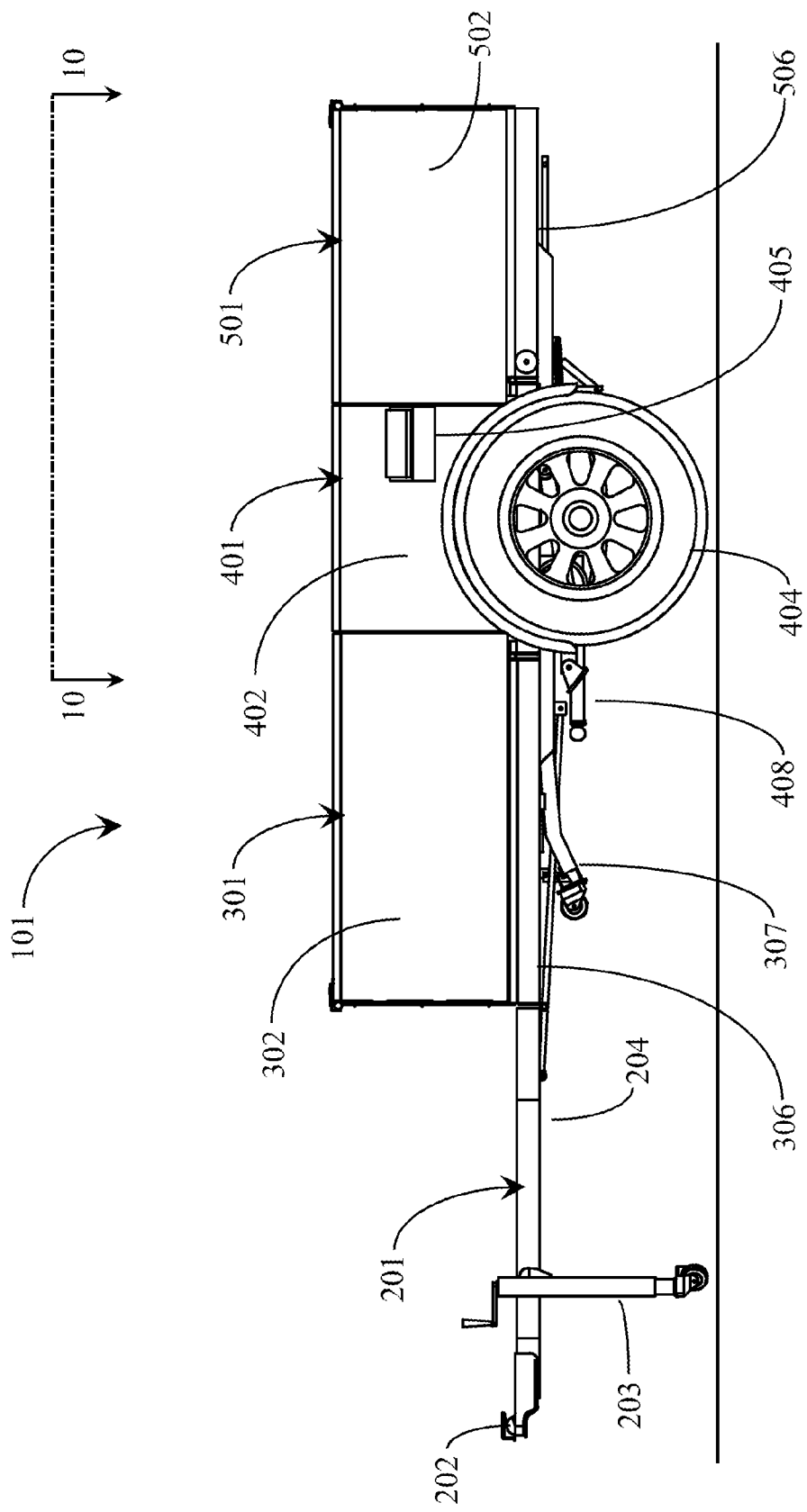
FIG. 5 is an elevation view of a foldable trailer of FIG. 1 and FIG. 2 shown in the transport position.
Figure 6:
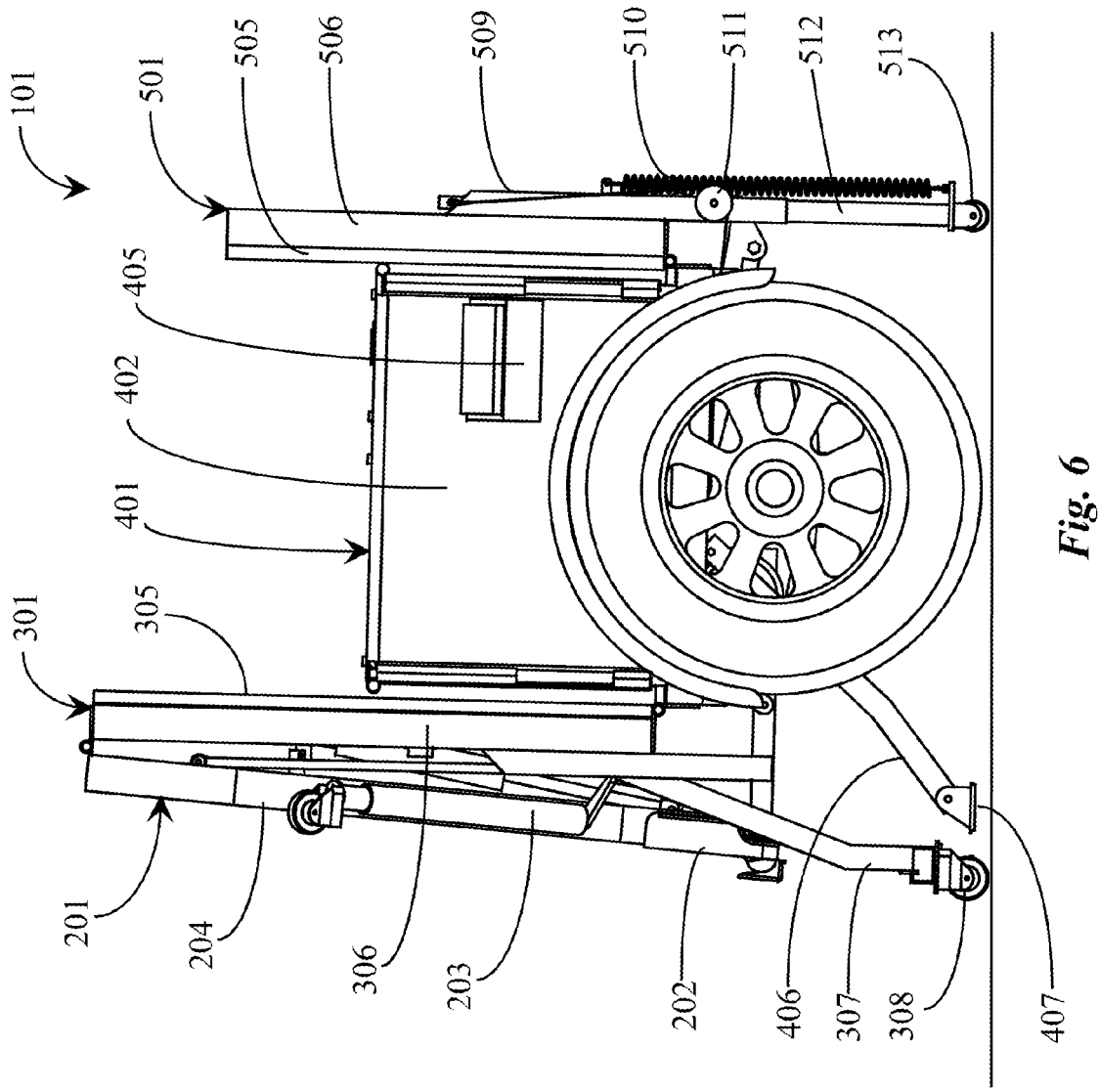
FIG. 6 is an elevation view of a foldable trailer of FIG. 1 and FIG. 2 shown in the folded position.

FIG. 5 is an elevation view of the foldable trailer of FIG. 1 and FIG. 2 that illustrates the "in transit" position of forward trolley lift leg 307 mechanism. In one embodiment of the present invention, the forward trolley lift leg is secured to the underside of the rectangular box steel frame 306 of the forward section 301 using a suitable securing device that may be remotely operated by the user to disengage the forward trolley lift leg from its secured position, for the purpose of operating as a lifting mechanism, and when powered to its secured position, be "locked" into position by a suitable "spring action" of the locking device. The securing device may also be mechanically operated by automation of hydraulics, pneumatics or by other forms of mechanical device, known to those skilled in the art. FIG. 6 is an elevation view of the foldable trailer of FIG. 1 and FIG. 2 in an embodiment of the present invention that further illustrates the "compact" configuration that may be obtained, from the folding of the tongue section 201, forward and rear sections 301 and 501 of the foldable trailer, to the "stationary" center section 401. These sections, being joined by transverse hinges, are supported by automated mechanics that deploy at different stages of the "folding" operation, and the foldable trailer is lifted from the ground, elevating the foldable trailer sections, axle and tires. This, in particular, will more readily allow the foldable trailer to be relocated to a storage facility which is supported in its entirety by the forward trolley lift leg 307, the forward trolley lift leg casters 308, the rear trolley support legs 512 and the rear support leg casters 513. In other embodiments, the forward trolley lift leg and the rear trolley support legs may have swiveling casters or other suitable rolling devices which may facilitate the relocation to a storage facility.

Figure 7:
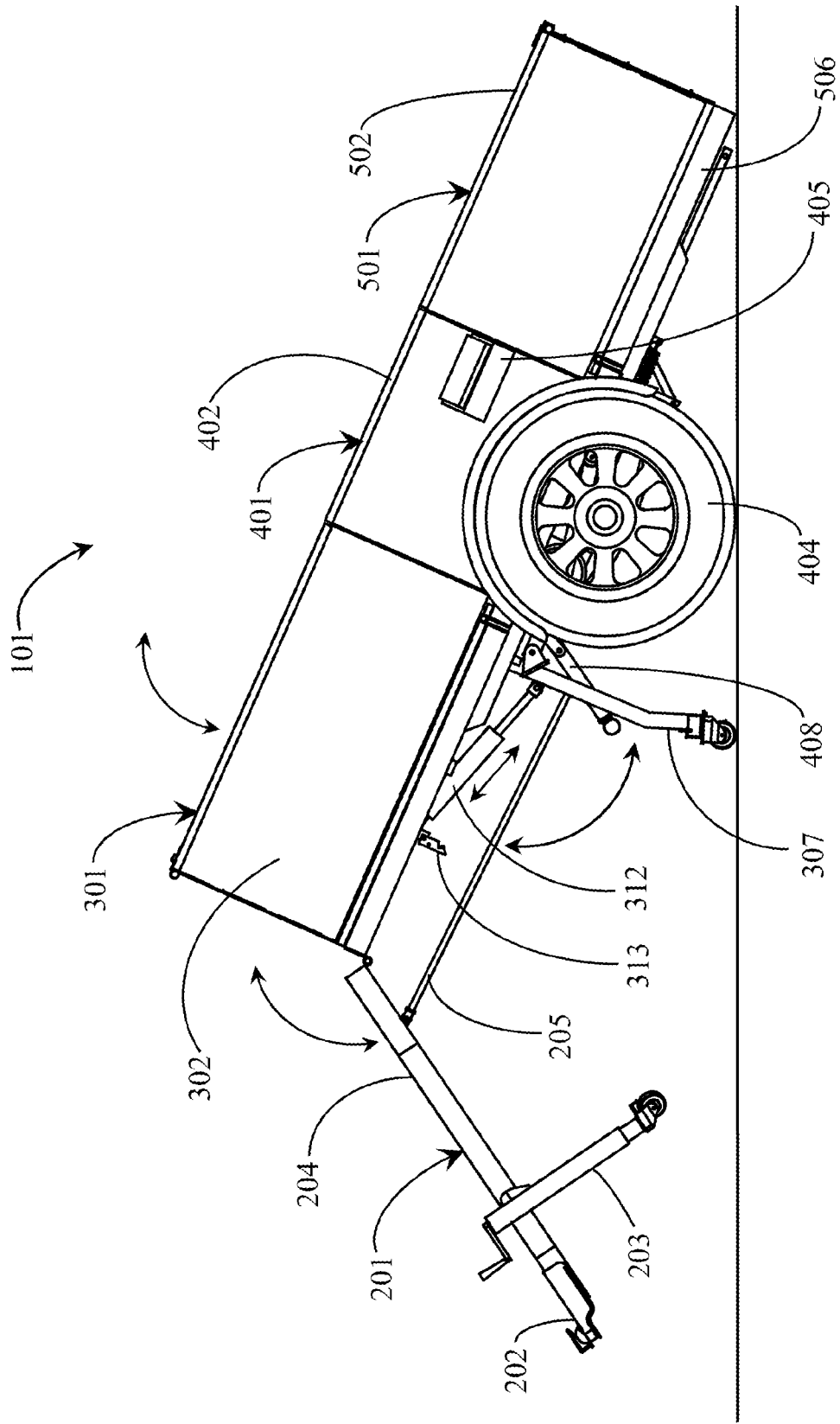
FIG. 7 is an elevation view of a foldable trailer of FIGS. 1 and 2 shown tilted to allow the loading or unloading of cargo while still attached to a towing vehicle (not shown).

In one embodiment of the invention of the foldable trailer 101, FIG. 7 and in conjunction with FIGS. 8a and 8b, depict the foldable trailer 101 in a 'tilted' orientation that will allow the user to remove or "off-load" various cargos which may have been loaded to the foldable trailer for transport. This may be facilitated while the ball hitch receiver 202 remains attached to the transporting vehicle's ball hitch (not shown), or may be accomplished in an "unattached" condition. In one embodiment, forward trolley lift leg 307 is utilized as a lifting device. After being unlocked from a forward trolley lift leg lock-arm 313, remotely by the user, from a "stowed" position on the underside of the forward section's rectangular box steel frame 306. The forward trolley lift leg is pushed downward by a double-action hydraulic cylinder 312 that is mounted to the forward section 301 rectangular box steel frame 306 with a bracket or other suitable attachment method that allows full rotation of the cylinder end and having the opposite end attached by bracket that allows full rotation of the opposite end, until the forward trolley lift leg casters 308 come into direct contact with the ground surface. Having leverage advantage, the forward trolley lift leg pushes the foldable trailer's forward section 301, center section 401 and rear section 501, which at this time form a continuously "flat" platform, into an angular orientation where the front is lifted upward and the rear is tilted downward, rotated about the axis of the axle 404, until the rear section 501 comes into direct contact to the ground at its aft undermost edge.

In an embodiment of the invention, while the foldable trailer sections are being rotated, a simultaneous rotation occurs of the tongue section 201 in a downward motion which pushes on a control rod 205. The control rod is attached to the tongue section 201 by means of a bracket affixed to a cross member of the tongue section's rectangular box steel frame 204. The control rod end has a through-hole "eyelet" link by which it is attached with a suitable bolt and threaded hardware, release pin or other method that allows free rotation of the link. The opposite end link is attached, in like manner, to a bracket or other suitable device, which is attached to a cross member on the forward trolley lift leg 307. This end link also has free rotation. The control rod element 205, attached thusly to the forward trolley lift leg and the tongue section, serves to control the motion of the tongue section relative to motion of the forward section as the powered forward trolley lift leg raises (or lowers) the forward section.

The ball hitch receiver lock pivots on a hinged attachment or other suitable mechanism attached to the underside of the center section 401 rectangular box steel frame element 409. This action allows for the free rotation of the forward trolley lift leg 307, without obstruction, in obtaining the amount of travel required to "tilt" the foldable trailer to the desired angle.

Figure 9:
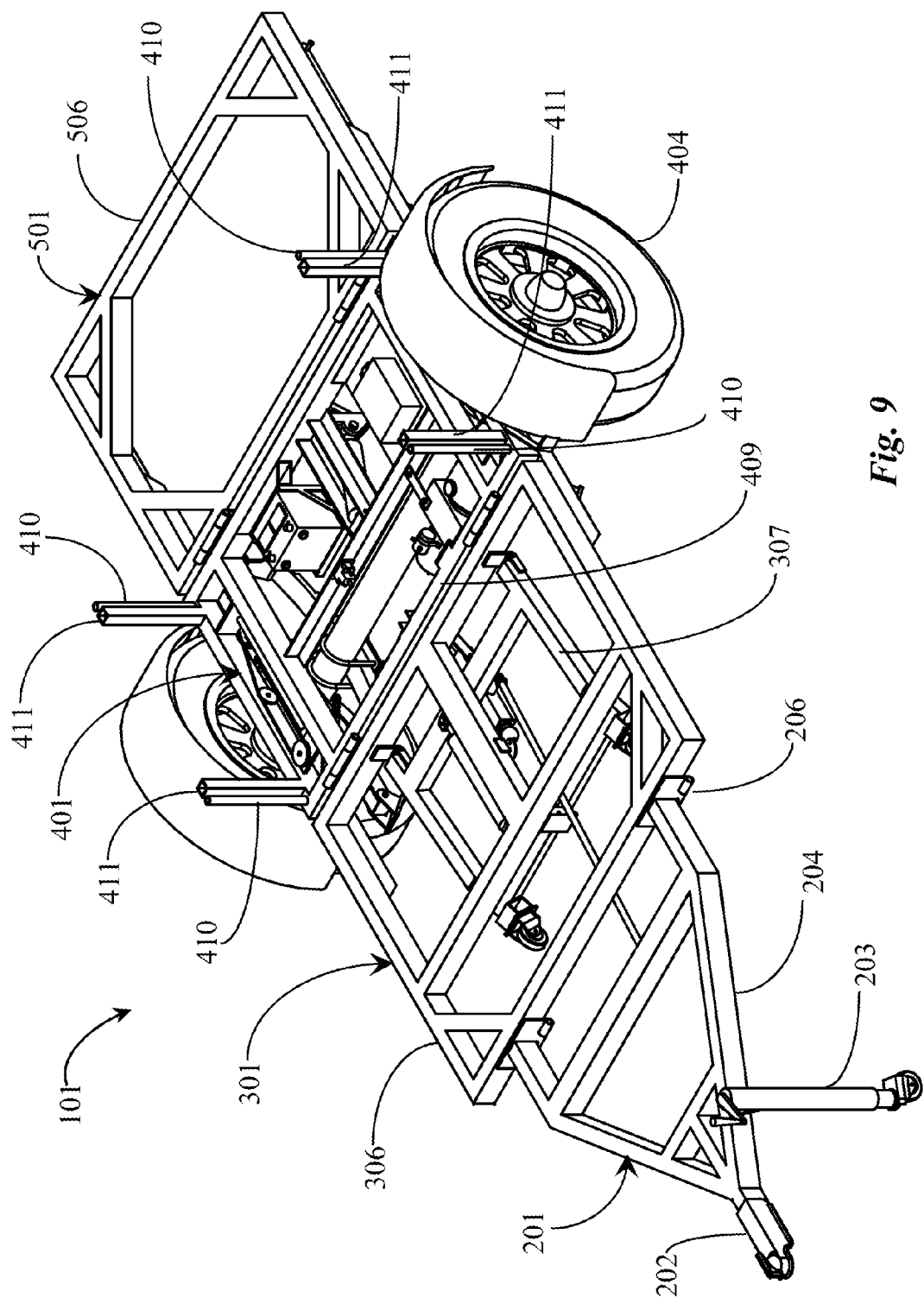
FIG. 9 is an isometric view of a foldable trailer of FIGS. 1 and 2 showing the essential structural frame elements.

FIG. 9 is an isometric view of an embodiment of the present invention of the foldable trailer 101 showing the essential frame elements that provide the primary load bearing rectangular box. These are steel frame elements 204, 306, 409 and 506. In one embodiment of the invention these elements may be a weldment form of tubular steel material or in other embodiments of the invention may be of pressed or formed steel and riveted or attached together in other acceptable manners to form ridged frames capable of bearing significant loads. The center section 401 is stationary in nature therefore the panels of this section are mounted on side panel stanchion elements 411 which may be made of a material such as square box steel or other suitable material known in the art. In one embodiment, these panels have square tubular straps attached to the panel wall by suitable means which allow it to slide over the mating element side panel stanchion 410, rendering them fixed in position, but removable for access to the underside of the center deck 403. In like fashion, the forward side panels 302 and rear side panels 502 slip onto side panel hinge pin elements 410, which being of a material such as, round tubular steel or a similar structural material, the side panels may be pivoted on the axis of the hinge pin element to their storable state, as illustrated in FIG. 4. The side panels, along with their attached end panels, may be "slipped" off of the hinge pin elements for storage "off" the foldable trailer, as an optional storage configuration.

In one embodiment suitable gussets and cross members are utilized as structural components to give rigidity to each individual section's rectangular box steel frame. These gussets and cross members may be of a like material to the parent frame, such as illustrated in FIG. 9 for rectangular box steel frame elements 204 and 506, or may be of a combination of other forms of structural steel that may be used, to provide an equal or greater advantage to resisting bend or structural stress to the box steel frame elements. In one embodiment structural steel elements have been attached to the primary rectangular box steel frame 409 of center section 401, providing attachment points for various elements of the power unit, such as the hydraulic pump, the double-action hydraulic cylinders, or components that may be necessary to drive the separate sections to their "folded" or closed state, and to unfold them as well. For example, there is a form of "hanging" bracket structure for maintaining a "battery box" in a fixed position but allowing easy access for removal or replacement. Also illustrated in FIG. 9, are cross members frame rails that are parallel, attached to the hinge bearing rails on each end and set apart to an appropriate distance to the external frame rail elements of the rectangular box steel frame 409, adjacent to the wheels. Plate steel elements are then attached at some distance and span the gap between each of these rails, to hang the "running" or "slide" components that are required for deployment of the forward support legs 407. In addition, the essential frame elements may contain appropriate light steel non-structural elements that provide attachment point for various "accessory" components, such as the control module or electrical terminal block to transfer necessary electrical conduits from section to section, or one component to another, for just a few examples. The exterior rails for the rectangular box steel frames may also be utilized to hang various components that provide appropriate lighting aspects, or enhance the protection of the cargos that may be carried from road and tire debris, by mounting tire fenders or other appropriate debris shields well known to the art.

Figure 10:
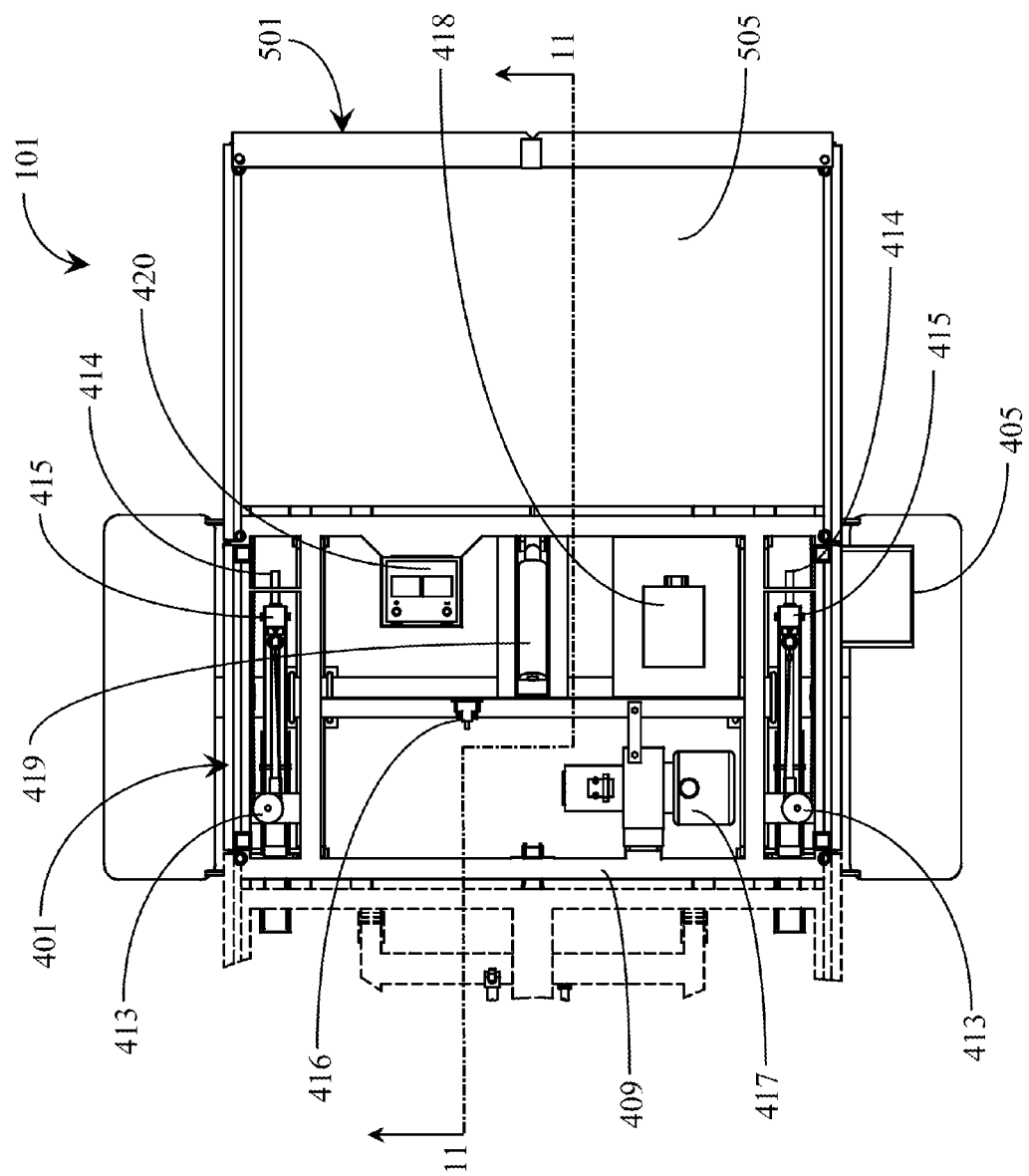
FIG. 10 is a partial plan view of the center and rear sections of a foldable trailer of FIG. 5.
Figure 11:
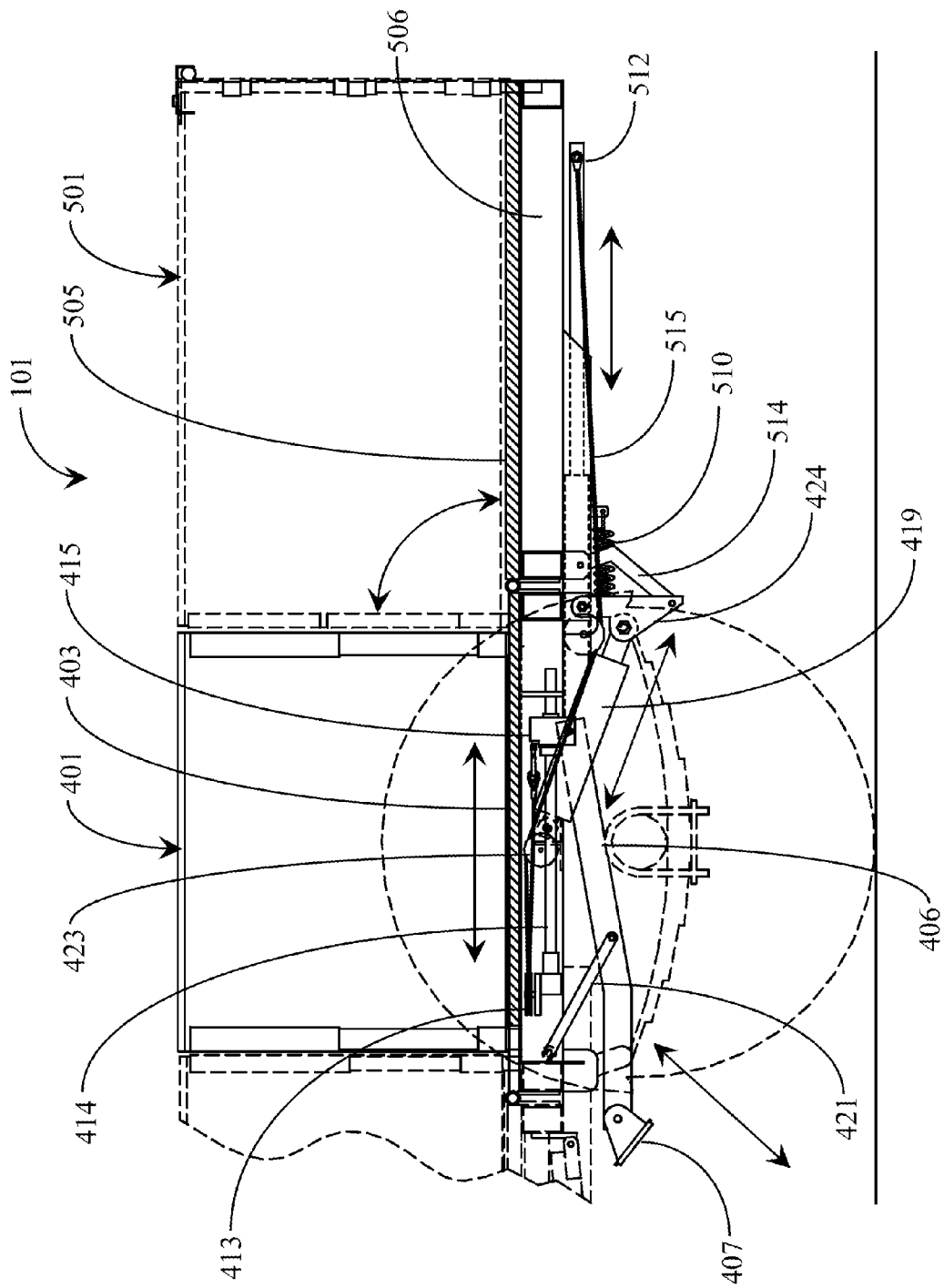
FIG. 11 is a partial section view of the center and rear sections of a foldable trailer of FIG. 10, showing the rear deck and center section support leg mechanisms.
Figure 12:
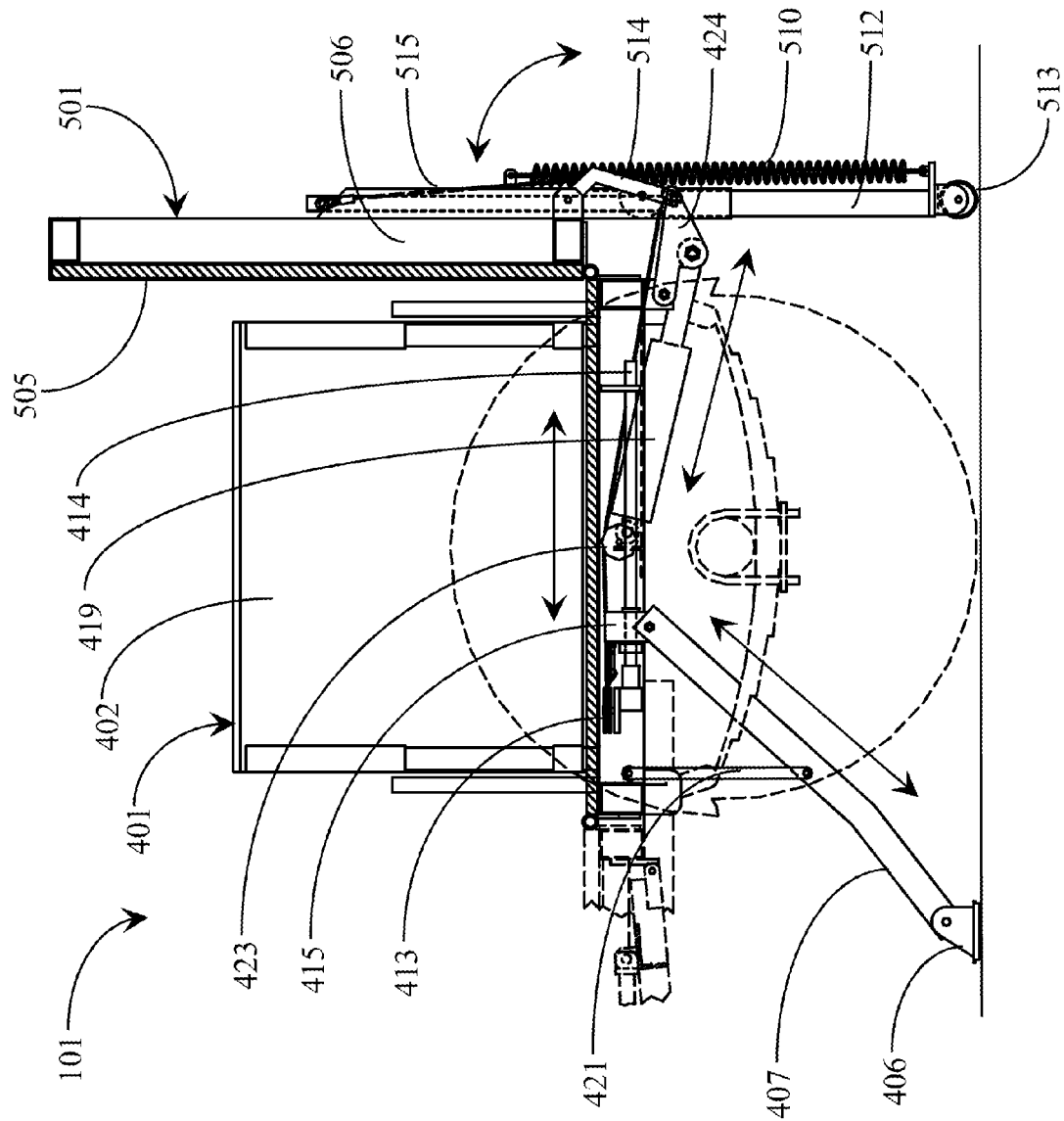
FIG. 12 is a partial section view of the center and rear sections of a foldable trailer of FIG. 10, showing the rear deck section and center section support leg mechanisms, with the rear section lifted to its folded position and the center section support legs deployed.

FIGS. 10-12 of foldable trailer 101 illustrate the necessary components that operate the forward and rear sections 301 and 501 to their "folded" or closed state. FIG. 10 is a partial plan view of the foldable trailer of FIG. 5, showing just the center section 401 and the rear section 501 components in general, according to one embodiment of the present invention. The rectangular box steel frame element 409 provides a primary structure in which to mount the components responsible for providing the hydraulic forces that act upon the other elements. A hydraulic power unit 417 comprises a rotating vane pump device, electrically driven from an external power source, such as battery element 420, and provides the primary means of pressure for driving the hydraulic peripherals. In other embodiments, the forces required to provide the lifting actions that leverage the motion of the individually hinged sections of the foldable trailer, may be a pneumatic-over-hydraulic, or a purely pneumatic system, or various others forms known to the art. The hydraulic power unit may be mounted on a hinged mount on one side and a bracket on the other. By loosening the bracket mount the hydraulic power unit may be pivoted up, out of its normal resting pocket, for added convenience for service. It may also be mounted in a near permanent fashion on rubber or plastic bushings with threaded fasteners, or in other ways known to those skilled in the art.

The hydraulic power unit is electrically connected to a hydraulic control module element 418 which provides a means of opening and closing proportioning valves and flow direction valves that allow for various combinations of control to the two double-action hydraulic cylinders of the foldable trailer, namely forward double-action hydraulic cylinder 312 (not shown in these views) and a rear double-action hydraulic cylinder 419. The rear double-action hydraulic cylinder is mounted by means of braces, centrally located on a perpendicular axis to the hinge bearing rail of the rectangular box steel frame 409, that sandwich the welded end of the rear double-action hydraulic cylinder using a captioned pivot shaft, or may be a bolt and appropriate threaded hardware.

The pressurization of the rear double-action hydraulic cylinder, on the end of the cylinder causing "extension" of the ram portion of the cylinder, extends the ram rearward and at some angle downward, initiating the rotation of a rear section swing arm element 424. The double-action hydraulic cylinder acting upon a rear section lift arm 514 element, causes a rotation about its hinge in an "upward" motion, acting upon rear section lift arm 514, which rotates upon its pivot link to the second part and a pivot link that resides upon a fixed bracket that is mounted to the rectangular box steel frame 506. This in turn, lifts the rear section 501 vertically about its hinged link to the center section 401, to a "folded" state, as is illustrated in FIG. 12.

Also illustrated in FIG. 10-12 is a system of structural and activated elements that are deployed to provide primary support to the foldable trailer of FIG. 1 and FIG. 2 during the folding operation of forward and tongue sections 301 and 201. The cantilevered weight of the previously mentioned section elements, contribute to a marked misalignment in weight distribution to the over-all configuration during the activity of folding the forward-of-axle elements of the foldable trailer. This largely results in a "tipping" effect of the foldable trailer, if left unsupported. The use of a combination of components and automation completely eliminate the possibility for this "tipping" effect to occur.

During the "folding" action of the rear section element, in one embodiment of the invention, rear trolley support legs 512, being housed in rear positive-stop rail elements 509, are deployed in a downward direction by means of a combination of a cable system and support leg return springs element 510. The rear trolley support legs are a weldment form of two separate shapes of steel, joined together with the lower section being a square tube shape steel that fits interiorly to the square tube shaped steel of the positive-stop rail 509. The upper section being made from a round tubular steel that extends beyond the length of the positive-stop rails of the rear section. The rear trolley support legs slide on the interior surfaces of the positive-stop rails during the rotation sequence of the rear section to a "folded" state. The control cable element 515 is a continuous twisted multi-strand steel cable, but may be any form of continuous strand material, such as high tensile nylon stranded rope or flexible sheathed carbon fiber rope, for just a few examples. The cables are constrained on the furthest aft points of the trolley support legs by means of eyelet loops and appropriate threaded fasteners, passed through these loops and attached directly to the protruding end of the trolley support legs. The opposite ends of the cables are led over and around several cable sheaves, elements 511, 423 and 413, and terminated on "eyelet" style shackle bolts on the slide block elements 415.

In one embodiment of the invention support leg return springs 510 are "extension" type springs, well known in the art for providing "return-to-position" force for linear motion of mechanisms requiring this type of action. The springs are attached by a "loop" formed on each end of the springs with one end passed through "eyelet" stanchions on the positive-stop rails 509 and at the opposite ends to similar stanchions attached to end plates of the rear trolley support legs 512. As the cables are tensioned by the rotation of the rear section, the rear trolley support legs are pulled in a downward motion, sliding out of their tubular steel housing of the positive-stop rails, until the support leg casters 513 make contact with the ground surface. In other embodiments of the invention, the rear trolley support legs may be actuated using any form of pneumatic and spring cylinder combination well known in the art.

In one embodiment of the present invention, a simultaneous action occurs in the folding of the rear section into an "upright" position. Namely, the deployment of the center section support legs 406. As the rear section rotates, it provides tension to the cable system previously noted, and is the direct cause, for the motion of the slide blocks 415 and their subsequent action. The slide blocks are of a light weight aluminum material, or may be of some other material, such as plastic or nylon for examples. The slide blocks have a bushing of bronze or slick UHMW plastic, pressed into the block form, that aids in resisting friction and metal to metal abrasion, that may occur during the sliding operation on the slide rod elements 414. The slide rods are of a material that is resistant to corrosion and their surface can be maintained in a polished state that provides little resistance to the slide blocks that slide on them, or may be of some other like material.

The slide blocks also act as a "bracket" in which the center section support legs 406 are attached by captioned pivot pins or by other acceptable forms of hardware. The center section support legs are linked to the slide block on their aft most point which moves pivotally with the slide block, when actuated by the cable systems pulling motion. The support leg is made of a steel "c" channel material, but may be of any other material or shape suitable for withstanding the supporting loads, which mechanisms of this nature encounter. The center support legs are suspended by support leg swing arm elements 421, one on each side at some distance down each legs length. The swing arm elements are a material suitable to their function, being of steel or other material that will allow the stress and strain tensions known to these types of mechanisms and those skilled in the art. The center swing arm elements are captioned on a pivot axle and spread spacer (not shown) that is sandwiched between two parallel frame members of the rectangular box steel frame 409 of the center section 401, at their uppermost extremity. To allow the center section support legs full freedom of extension to the ground to provide a support function, the support leg swing arms are drilled and pivoted on a bolt or pin which connects the two swing arms through the support leg, which allows for the extension of the center section support legs 406 and the support leg feet 407, to make contact with the ground at varying angles, as illustrated in FIG. 11 and FIG. 12.

Further illustrated in FIG. 11 and FIG. 12 are direction arrows that show the individual motions of the elements that are acted upon by the double-action hydraulic cylinder 419, as it is pressurized on the "extend" side of its double-action motion, and subsequently on the opposite "retract" side, thus lifting or lowering the rear center section to an "upright" position and subsequently, in the opposite direction, to the open or "transit" position. The other elements being acted upon by this cylinder and the rotation of the rear section, act in unison and simultaneously to the initiation of the hydraulic system by the operator, at the centrally located control panel 405 of the foldable trailer 101, according to an embodiment of the present invention.

Figures 13A, 13B:
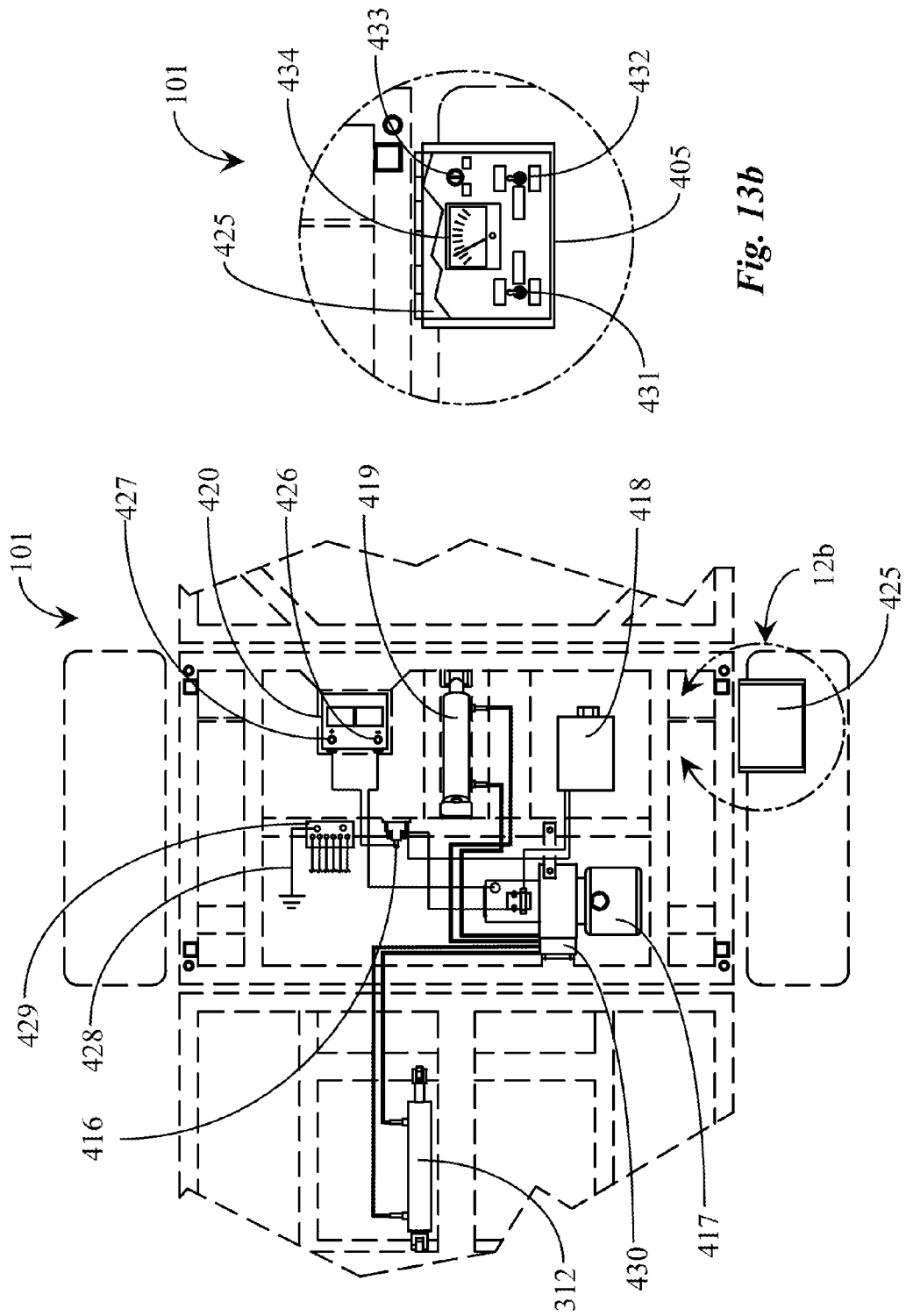
FIG. 13a is a block diagram showing the hydraulic and control mechanisms of the foldable trailer of FIG. 1 and FIG. 2.
FIG. 13b is a detail view showing the control panel of the foldable trailer of FIG. 1 and FIG. 2.

FIG. 13*a* is a block diagram showing the hydraulic and control mechanisms of the foldable trailer 101 for the front section. The center section's rectangular box frame element 409 being shown in dashed line, the forward and center section's rectangular box frame elements 306 and 506, being partially viewed and in dashed lines, are represented here, only to give a general understanding as to the location of the elements described hereafter. The center section 401, being the pivotal section of the foldable trailer, contains the primary elements for powering and operating the hydraulic system that rotates the forward section 401 and the rear section 501 to their storable state, according to embodiments of this disclosure. The hydraulic power unit 417, being mounted to the rectangular box frame element of the center section on a hinged swing-arm bracket, which allows it to be rotated away from the frame structure for service, and provides the means of hydraulic pressure to the hydraulic systems peripheral devices. The hydraulic power unit motor receives its electrical power from an independent on-board power supply, namely a battery element 420 which is located on a suspended "battery tray" attached to the frame structure of the center section with a suitable strap that protects the battery from unnecessary and possibly damaging vibration. According to one embodiment of the invention, the battery is of a lead acid, exteriorly vented type, but may be a battery of other manufactured forms known to the art, such as, but not limited to, sealed lead-acid and internally vented, glass-matte gel-cell battery technology or deep-cycle lithium-ion technologies are just a few possibilities. The battery supplies the electrical system with 12V electrical current, but may provide other voltages that are common to the art, such as 36V or high-voltage system inverters and converters that will boost or "transform" the voltage from one current type to another, to state a few examples. The battery positive terminal element 427 is connected to a terminal block 416 with copper insulated wire of a sufficient gage to carry the load current, and then to a control module 418 with copper insulated wire and a fusible link for circuit protection. A primary positive voltage link is made then, to the positive terminal of a solenoid mounted on the hydraulic pump's motor housing. The negative battery terminal 426 is connected to the motor housing of the hydraulic pump providing a ground connection for the system. From the ground connection on the motor housing of the hydraulic pump, a negative copper insulated jumper lead is inter-connected to the negative terminal of the solenoid mounted on the hydraulic pump housing.

In one embodiment of the present invention, a terminal block may be provided for various 12V circuit connections to a terminal block 429 that performs a central connection point for lighting and voltage supply to gauges or other instrumentation that may require it. A positive power supply, copper insulated wire, from the positive terminal block 416 can be led to the positive terminal element of the terminal block proving a power supply to all of the electrical peripherals for the foldable trailer. A ground terminal strap supplies ground condition, and is inter-connected from the negative terminal of the terminal block 429 directly to the rectangular box steel frame of the center section 401.

Control module 418 is interconnected to the control panel 405 (depicted in FIG. 13b) with copper insulated wires and a weather resistant conduit, that protect the wires from road debris and salt spray, according to one embodiment of the invention. There are other interconnects then from this same control panel to switches that operate, in a control fashion, the various functions of the motor (not shown) on the hydraulic power unit. The fashions and methods for controlling devices of a hydraulic system are well known to those skilled in the art, therefore, will not be greatly expanded upon in the scope of this disclosure.

The forward double-action hydraulic cylinder 312 is pressurized through an inter-connected high-pressure hose that begins at a hydraulic unit valve block element 430 and terminates on the "high" side (the side furthest from the cylinders "ram" end) of the double-action hydraulic cylinder. When this hose is "pressurized", the ram end of the hydraulic cylinder "extends", acting upon the forward trolley lift leg mechanism, pushing it downward and toward the foldable trailer's axle element. The "signal" initiating this is accomplished from the user depressing a button or toggle that provides electrical contact and therefore, completes a circuit of the control unit and subsequently to the hydraulic motor, activating the pump to provide high pressure force to the hydraulic cylinder. Adversely, the same being true for the "retraction" of the double-action hydraulic cylinder when the user operates a separate button or toggle of the control panel. The hydraulic cylinder, being inter-connected by a high-pressure hose that begins at the hydraulic unit valve block and terminates on the "low" side (the side closest to the cylinders "ram" end) of the hydraulic cylinder, is pressurized and forces the cylinder to "retract". The actions described above result in the lifting of the forward section to a "folded" or closed state and simultaneously "folding" to the underside of the forward section, the tongue section of the foldable trailer 101.

The rear double-action hydraulic cylinder 419 is pressurized through an inter-connected high-pressure hose that begins at a hydraulic unit valve block element 430 and terminates on the "high" side (the side furthest from the cylinders "ram" end) of the double-action hydraulic cylinder. When this hose is "pressurized", the ram end of the hydraulic cylinder "extends", acting upon the rear section swing arm 424 mechanism (depicted previously in FIG. 12), pushing it downward and pivotally towards the rear section lift arm element. The "signal" initiating this is accomplished from the user depressing a button or toggle that provides electrical contact and therefore, completes a circuit of the control unit and subsequently to the hydraulic motor, activating the pump to provide high pressure force to the hydraulic cylinder. Adversely, the same being true for the "retraction" of the double-action hydraulic cylinder when the user operates a separate button or toggle of the control panel. The hydraulic cylinder, being inter-connected by a high-pressure hose that begins at the hydraulic unit valve block and terminates on the "low" side (the side closest to the cylinders "ram" end) of the hydraulic cylinder, is pressurized and forces the cylinder to "retract". The actions described above result in the "folding" of the rear section and simultaneously, the deployment of the forward support legs that provide stability to the foldable trailer, while the forward and tongue sections are being closed to a "folded" state.

FIG. 13b illustrates a block diagram of the centrally located control panel 405. It is mounted to the side wall panel of the center section 401 of one embodiment, but may be mounted in any location preference of the individual user, and comprises the controlling switches that a user operates to perform the various "folding" operations of the foldable trailer 101. To operate the folding of the forward and tongue sections, the toggle switch 431 that may be labeled "Front" with other labels being appropriate for direction, such as "Up" and "Down", is utilized to initiate pressurizing of the forward double-action hydraulic cylinder. Also housed in the control panel is a toggle switch 432 that may be labeled "Rear" with other labels being appropriate for direction, such as "Up" and "Down", is utilized to initiate the pressurizing of the rear double-action hydraulic cylinder, which in turn, performs the actions necessary for the "folding" of the rear section and simultaneously deploying the center section support legs. The electrical power aspects of the hydraulic system are initiated by a "keyed" power On/Off switch 433 and directional labels that indicate to the use the "On" position for the key and the "Off" position, as well. Power is provided to the hydraulic system when the key is rotated to the "On" position and adversely, turned off or without power when rotated to the "off" position.

According to one embodiment of the invention, a voltmeter is mounted to the face of the control panel that may give the user an indication to the level of charge that the on-board battery has. In other embodiments, the control panel may also include a "pressure" indicator that reflects the "health" of the hydraulic system. The control panel may also have an environmental control panel cover 425 that is hinge mounted to the main body of the control panel and provides the element of protection to switches and gauges from UV or moisture damage. It could be of a material such as plastic or stainless steel, for a few examples.

Figure 14A:
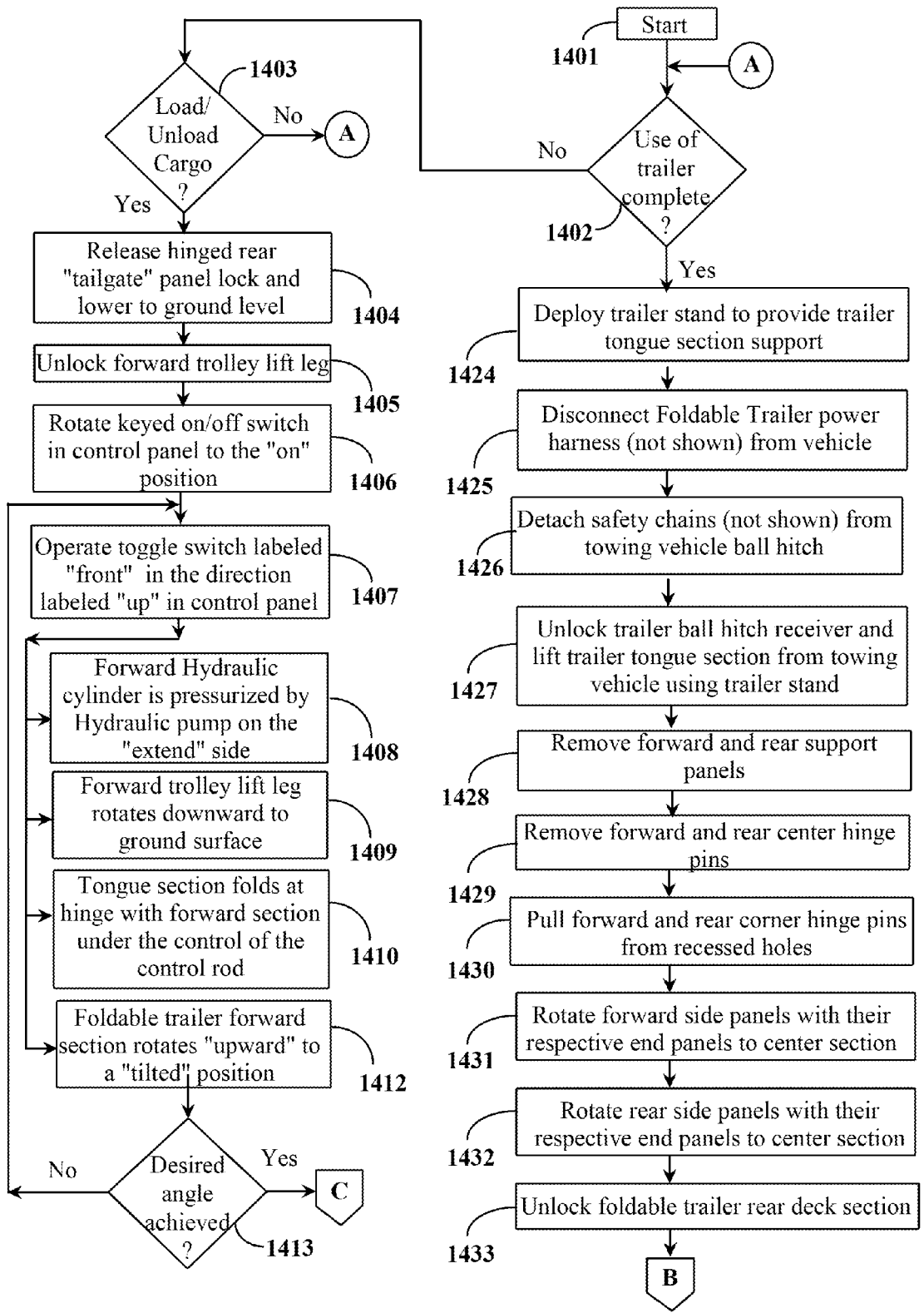
FIG. 14a is a flowchart diagram that describes the steps required for the detachment from a towing vehicle and the folding, in preparation for storage, of a foldable trailer of FIG. 1 and FIG. 2.
Figure 14B:
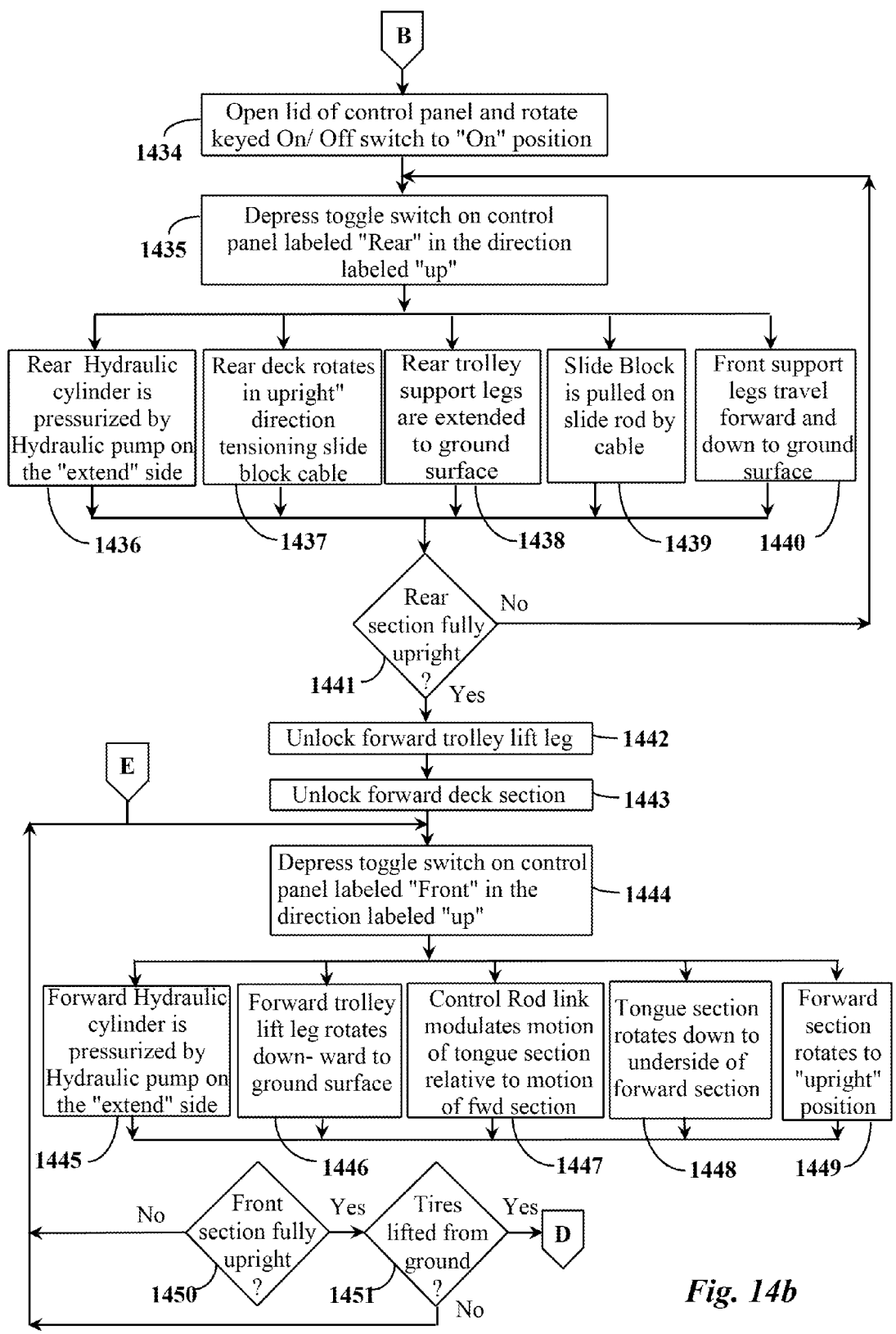
Figure 14C:
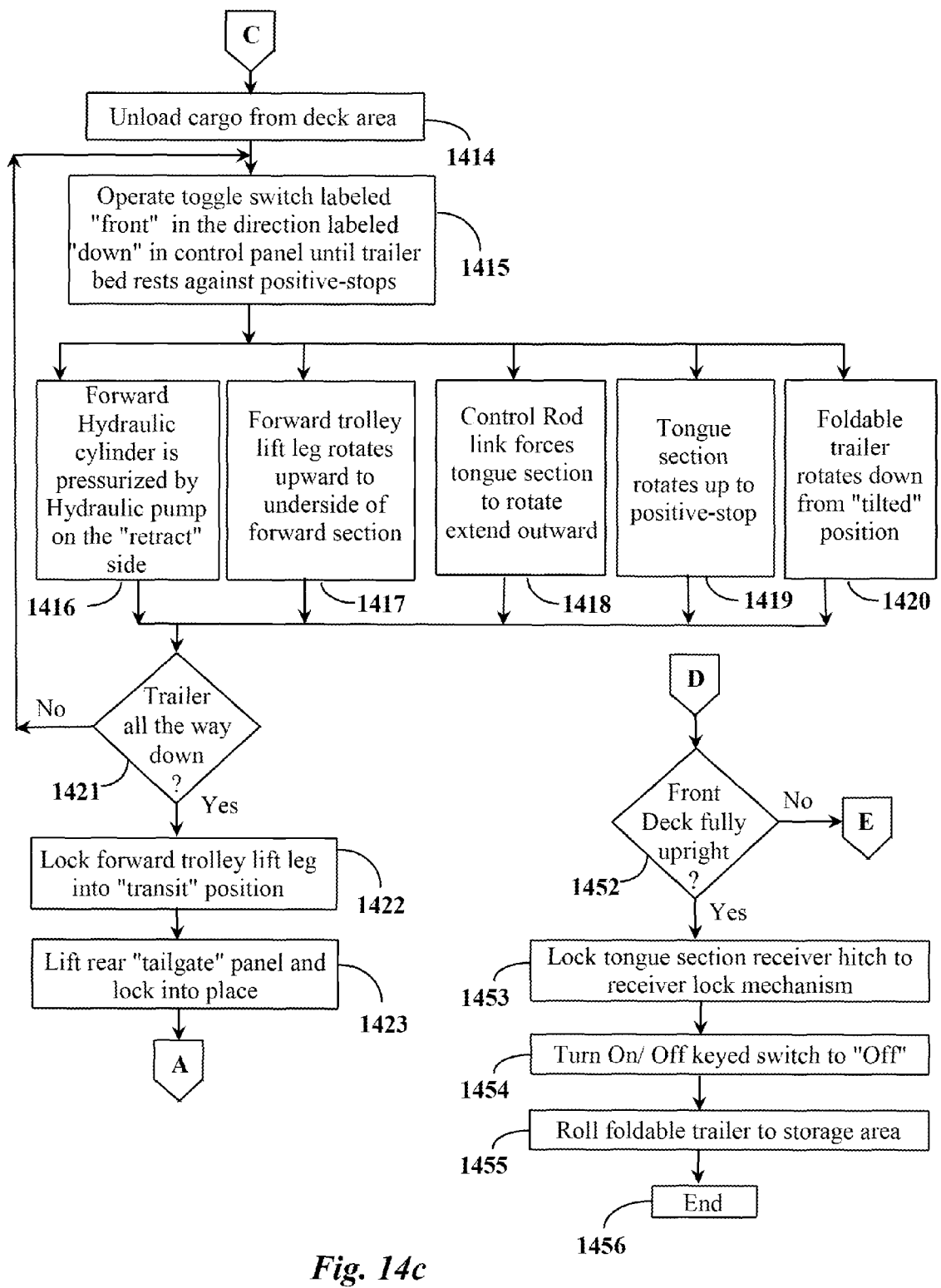
FIG. 14c is a continuation of the flowchart diagram of FIG. 14b.

FIGS. 14a, 14b and 14c is a flow chart that describes the process of tilting the trailer to load or unload cargo, and the process of folding the trailer to a compact storage configuration supported entirely on a wheeled trolley with the main wheels off the ground. At step 1401 start process. At logic step 1402, use of trailer complete? If yes, disregard until logic step 1423. If no, proceed to logic step 1403 load/unload cargo? If no, return to logic step 1402. If yes, at step 1404 release hinged rear "tailgate" panel lock and lower to ground level. At step 1405 unlock forward trolley lift leg. At step 1406 rotate keyed on/off switch in control panel to the "on" position. At step 1407 operate toggle switch labeled "up" in control panel (following step 1407, steps 1408-1411 occur simultaneously). At step 1408 forward hydraulic cylinder is pressurized by hydraulic pump on the "extend" side. At step 1409 forward trolley lift leg rotates downward to ground surface. At step 1410 tongue section folds at hinge with forward section under the control of the control rod. At step 1412 foldable trailer forward section rotates "upward" to a "tilted" position.

At logic step 1413 desired angle achieved? If no, return to step 1407. If yes, proceed to step 1414 unload cargo from deck area. At step 1415 operate toggle switch labeled "front" in the direction labeled "down" in control panel until trailer bed rests against positive-stops (Following step 1415, steps 1416-1420 occur simultaneously). At step 1416 forward hydraulic cylinder is pressurized by hydraulic pump on the "retract" side. Step 1417 forward trolley lift leg rotates upward to underside of forward section. At step 1418 control rod link forces tongue section to extend outward and at step 1419 tongue section rotates up to positive-stop. At step 1420 foldable trailer rotates down from "tilted" position.

At logic step 1421 trailer all the way down? If no, return to step 1415. If yes proceed to step 1422 lock forward trolley lift leg into "transit" position. At step 1423 lift rear "tailgate" panel and lock into place. Following step 1423 return to logic step 1402 use of trailer complete? If no, return to logic step 1403. If yes, proceed to step 1424.

At step 1424 deploy trailer stand to provide trailer tongue section support. At step 1425 disconnect foldable trailer power harness (not shown) from towing vehicle ball hitch. At step 1427 unlock trailer ball hitch receiver and lift trailer tongue section from towing vehicle using trailer stand.

At step 1428 remove forward and rear support panels. At step 1429 remove forward and rear center hinge pins. At step 1430 pull forward and rear corner hinge pins from recessed holes. At step 1431 rotate forward side panels with their respective end panels to center section. At step 1432 rotate rear side panels with their respective end panels to center section. At step 1433 unlock foldable trailer rear deck section. At step 1434 open lid of control panel and rotate keyed on/off switch to "on" position. At step 1435 depress toggle switch on control panel labeled "Rear" in the direction labeled "up" (following step 1435, steps 1436-1440 occur simultaneously). At step 1436 rear hydraulic cylinder is pressurized by hydraulic pump on the "extend" side. At step 1437 rear deck rotates in "upright" direction tensioning slide block cable. At step 1438 rear trolley support legs are extended to ground surface. At step 1439 slide block is pulled on slide rod by cable. At step 1440 front support legs travel forward and down to ground surface.

At logic step 1441 rear section fully upright? If no, return to step 1435. If yes, proceed to step 1442 unlock forward trolley lift leg. At step 1443 unlock forward deck section. At step 1444 Depress toggle switch on control panel labeled "Front" in the direction labeled "up", (following step 1444, steps 1445-1449 occur simultaneously). At step 1445 forward hydraulic cylinder is pressurized by hydraulic pump on the "extend" side. At step 1446 forward trolley lift leg rotates downward to ground surface. At step 1447 control rod link modulates motion of tongue section relative to motion of forward section. At step 1448 tongue section rotates down to underside of forward section. At step 1449 forward section rotates to "upright" position.

At logic step 1450 front section fully upright? If no, return to step 1444. If yes, proceed to logic step 1451 tires lifted from ground? If no, return to step 1444. If yes, proceed to logic step 1452 front deck fully upright?

If no, return to step 1444 and proceed. If yes, proceed to step 1453 lock tongue section receiver hitch to receiver lock mechanism. At step 1454 turn on/off keyed switch to "off". At step 1455 roll foldable trailer to storage area. At step 1456, the process is complete.

Figure 15A:
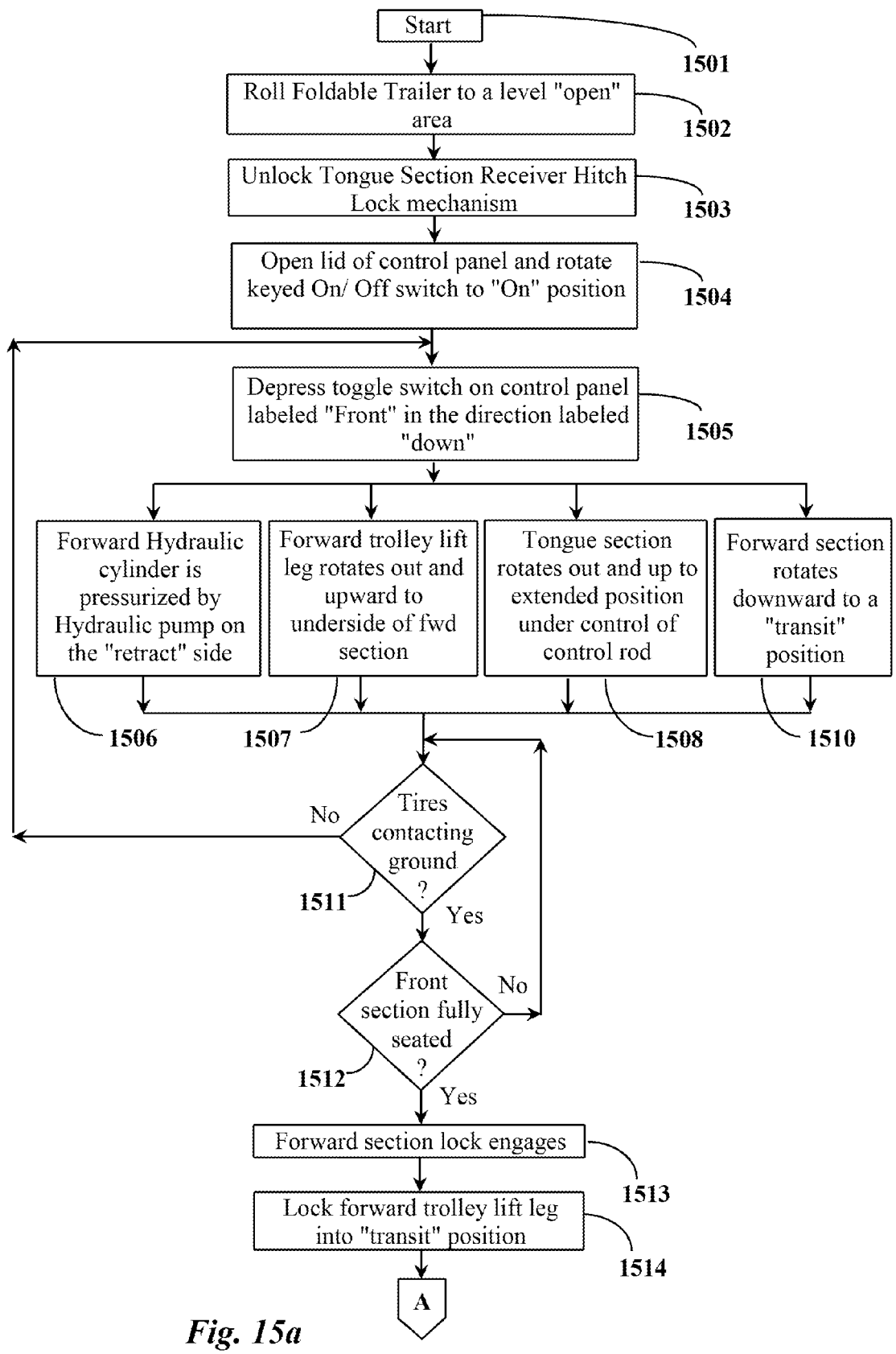
FIG. 15a is a flowchart diagram that describes the steps required for the unfolding and attachment to a towing vehicle, in preparation for transport, of a foldable trailer of FIG. 1 and FIG. 2.
Figure 15B:
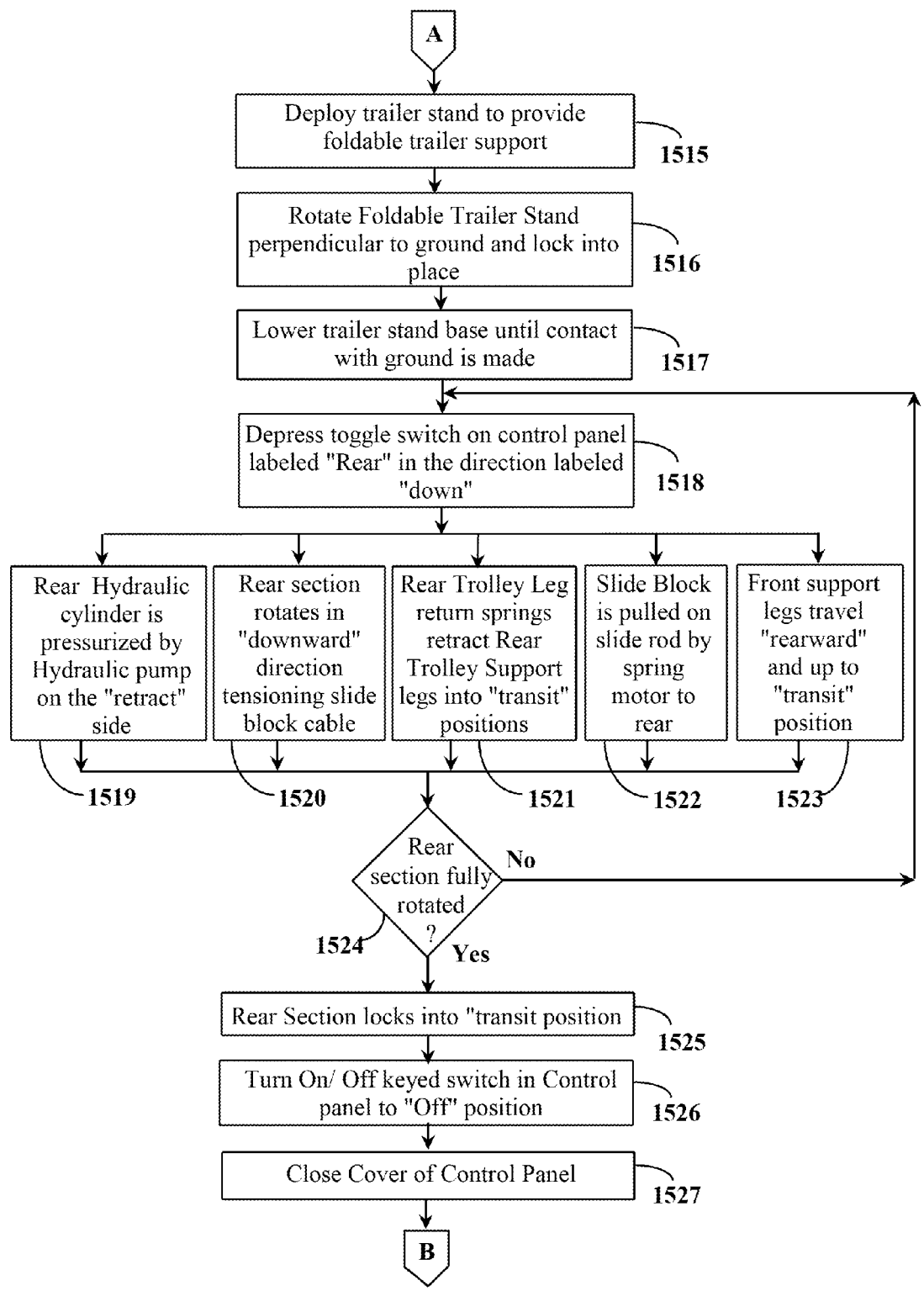
Figure 15C:
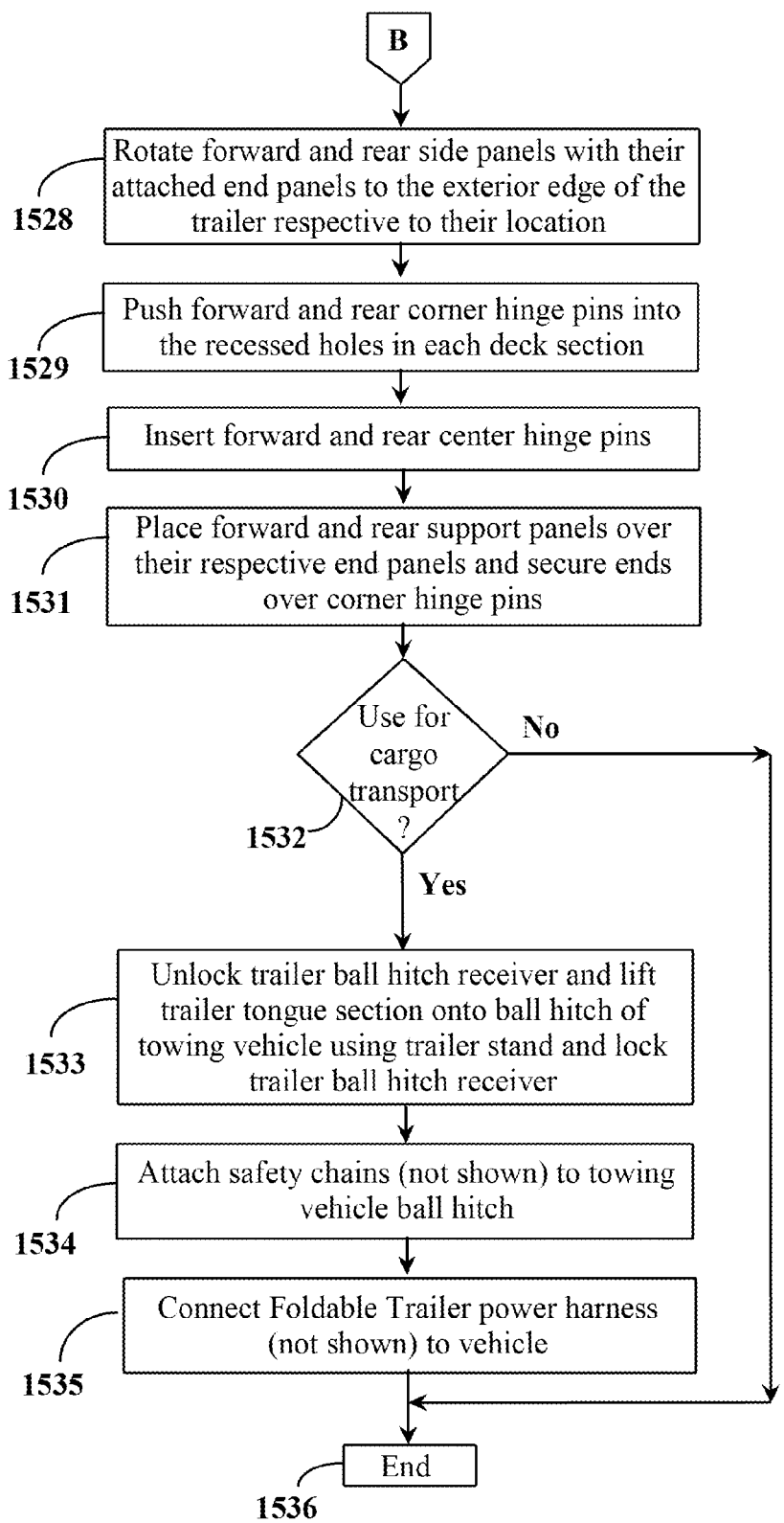
FIG. 15c is a continuation of the flowchart diagram of FIG. 15b.

FIGS. 15a, 15b and 15c is a flow chart that describes the process of unfolding the trailer from the compact configuration on the trolley, to a fully-extended configuration with side panels deployed, and ready to load cargo and be used as a towed trailer. At step 1501 start process. At step 1502 roll foldable trailer to a level "open" area. At step 1503 unlock tongue section receiver hitch lock mechanism. At step 1504 open lid of control panel and rotate keyed on/off switch to "on" position. At step 1505 depress toggle switch on control panel labeled "Front" in the direction labeled "down" (following step 1505, steps 1506-1510 occur simultaneously). At step 1506 forward hydraulic cylinder is pressurized by hydraulic pump on the "retract" side. At step 1507 forward trolley lift leg rotates out and upward to underside of forward section. At step 1508 tongue section rotates out and up to extended position under control of control rod link. At step 1510 forward section rotates downward to a "transit" position. At logic step 1511 tires contacting ground? If no, return to step 1505. If yes, proceed to logic step 1512 front section fully seated? If no, return to logic step 1511. If yes, proceed to step 1513 forward section lock engages. At step 1514 lock forward trolley lift leg into "transit" position. At step 1515 deploy trailer stand to provide foldable trailer support. At step 1516 rotate foldable trailer stand perpendicular to ground and lock into place. At step 1517 lower trailer stand base until contact with ground is made. At step 1518 depress toggle switch on control panel labeled "rear" in the direction labeled "down" (following step 1518, steps 1519-1523 occur simultaneously). At step 1519 rear hydraulic cylinder is pressurized by hydraulic pump on the "retract" side. At step 1520 rear section rotates in "downward" direction tensioning slide block cable. At step 1521 rear trolley leg return springs retract rear trolley support legs into "transit" positions. At step 1522 slide block is pulled on slide rod by spring motor to rear. At step 1523 front support legs travel "rearward" and up to "transit" position.

At logic step 1524 rear section fully rotated? If no, return to step 1518. If yes, proceed to step 1525 rear section locks into "transit" position. At step 1526 turn on/off keyed switch in control panel to "Off" position. At step 1527 close cover of control panel. At step 1528 rotate forward and rear side panels with their attached end panels to the exterior edge of the trailer respective to their location. At step 1529 push forward and rear corner hinge pins into the recessed holes in each deck section. At step 1530 insert forward and rear center hinge pins. At step 1531 place forward and rear support panels over their respective end panels and secure ends over corner hinge pins.

At logic step 1532 use for cargo transport? If no, proceed to step 1536 end process. If yes, proceed to step 1533 unlock trailer ball hitch receiver and lower trailer tongue section onto ball hitch of towing vehicle using trailer stand. Lock trailer ball hitch receiver. At step 1534 attach safety chains (not shown) to towing vehicle ball hitch. At step 1535 connect foldable trailer power harness (not shown) to vehicle. At step 1536 the process is complete.

It will be apparent to the skilled artisan that there are many ways the embodiments described in this specification may be altered without departing from the spirit and scope of the invention. There are, for example, many different sizes and depths that may be used for trailers of different size and use when fully deployed. There are also many different ways that the different parts of the trailer may be attached together and assembled. Different numbers and types of hinges may be used between the foldable sections. Different locking mechanisms may be used. The motive power for folding or deploying may be provided hydraulically, pneumatically, or by combinations of these types. In some embodiments human-powered cranks and other force multiplier devices may be used, rather than the power components illustrated in the various examples described. There are many such alterations that may be made without departing from the spirit and scope of the invention.

What is claimed is:

1. A foldable trailer, comprising:
   a substantially horizontal, substantially planar center section joined to at least one main axle and wheels assembly;
   a substantially planar rear section attached to the center section by a first hinged interface, such that the rear section may be folded from a substantially horizontal position, coplanar with the center section, to a substantially vertical position relative to the horizontal center section;
   a substantially planar forward section attached to the center section by a second hinged interface, such that the forward section may be folded from a substantially horizontal position, coplanar with the center section, to a substantially vertical position relative to the horizontal center section;
   a tongue section attached to the substantially planar forward section by a third hinged interface on an edge of the substantially planar forward section opposite the second hinged interface, such that the tongue section is enabled to fold downward around the third hinged interface, as the forward section is folded upward, resulting in both the tongue section and the forward section being oriented to a substantially vertical position relative to the center section;
   a forward set of trolley legs hinged at one end to a frame member of the substantially planar forward section, having trolley wheels at an end opposite the hinged end, the forward set of trolley wheels constrained by mechanical mechanism to rotate downward as the substantially planar forward section is folded upward, causing the trolley wheels to contact ground surface as the substantially planar forward section approaches vertical;
   a rear set of trolley legs having trolley wheels on one end and constrained to translate in a direction parallel to the plane of the substantially planar rear section such that the trolley wheels of the rear set of trolley legs contacts ground surface as the substantially planar rear section approaches vertical;
   a first powered linkage adapted to fold the substantially planar forward section upward around the second hinged interface and a second powered linkage adapted to fold the substantially planar rear section around the first hinged interface; and
   an electrically-operated control interface adapted to operate the first and second powered linkages to fold the substantially planar rear and forward sections upward relative to the substantially planar center section, the control interface comprising one or more switch inputs to initiate power to the first and second powered linkages to cause the trailer to fold;
   wherein, as the substantially planar forward and rear sections are folded upward, the sets of trolley legs are deployed downward, lifting the folded trailer on the trolley wheels with the main axle and wheels assembly off ground level, such that the folded trailer may be moved about on the trolley wheels without interference from the main axle and wheels assembly.

2. The foldable trailer of claim 1 wherein the power for the powered linkages is provided by one or a combination of hydraulic or pneumatic motive systems.

3. The foldable trailer of claim 1 further comprising a stabilizer foot deployable from a forward side of the center section to contact ground level.

4. The foldable trailer of claim 3 wherein the forward set of trolley lift legs are adapted to be deployed with the rear and forward sections locked coplanar with the center section, to tilt the trailer to a backward angle to facilitate loading and unloading cargo.

5. The foldable trailer of claim 3 wherein the stabilizer foot is deployed as the rear section is folded upward, to prevent the trailer from moving on the main wheels before the main wheels are lifted from ground level by deployment of the trolley legs.

6. The foldable trailer of claim 1 wherein, with the forward and rear sections arranged coplanar with the center section, and forming a trailer bed, the trailer further comprises removable side panels arranged around the periphery of the trailer bed.

7. The foldable trailer of claim 6 wherein the side panels associated with the forward and the rear sections are enabled to be folded onto the center section prior to folding the center and forward sections relative to the center section.

8. The foldable trailer of claim 1 comprising a single forward and a single rear section, with the tongue section hinged to the forward section opposite the second hinged interface.

* * * * *